US011345427B2

(12) United States Patent
McLean et al.

(10) Patent No.: US 11,345,427 B2
(45) Date of Patent: May 31, 2022

(54) PERSONAL MOBILITY VEHICLE

(71) Applicant: Ford Global Technologies, LLC, Dearborn, MI (US)

(72) Inventors: Nathaniel David McLean, Leigh-On-Sea (GB); Tharsika Nanthapalan, Enfield (GB)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 16/405,652

(22) Filed: May 7, 2019

(65) Prior Publication Data
US 2019/0346859 A1    Nov. 14, 2019

(30) Foreign Application Priority Data

May 8, 2018   (GB) ...................................... 1807480

(51) Int. Cl.
*B62K 3/00*    (2006.01)
*G05D 1/02*    (2020.01)
*H04W 4/024*   (2018.01)
*H04W 4/48*    (2018.01)
*H04W 4/80*    (2018.01)
(Continued)

(52) U.S. Cl.
CPC ............. *B62K 3/002* (2013.01); *B62K 5/007* (2013.01); *G05D 1/0276* (2013.01); *H02J 7/00* (2013.01); *H02J 7/0044* (2013.01); *H04N 7/183* (2013.01); *H04W 4/024* (2018.02); *H04W 4/029* (2018.02); *H04W 4/48* (2018.02); *H04W 4/80* (2018.02); *H04W 12/71* (2021.01); *B62J 43/16* (2020.02); *B62J 43/20* (2020.02); *B62J 45/10* (2020.02);
(Continued)

(58) Field of Classification Search
CPC .............. G05D 1/0276; G05D 1/0038; G05D 1/0055; H04W 4/024; H04W 4/48; H04W 4/029; H04W 4/80; H04W 12/00512; H04W 12/71; B60R 2300/20; B62J 99/00; B62J 45/20; B62J 45/10; B62K 5/007; B62K 2202/00; B62K 2204/00; H02J 7/00; H02J 7/0044; H04N 7/183
See application file for complete search history.

(56) References Cited

U.S. PATENT DOCUMENTS

| 4,750,578 A | 6/1988 | Brandenfels |
| 6,907,949 B1 | 6/2005 | Wang |
| 2001/0013435 A1 | 8/2001 | Ono |
| 2004/0182615 A1 | 9/2004 | Matte |

(Continued)

FOREIGN PATENT DOCUMENTS

| CN | 202029972 U | 11/2011 |
| CN | 203047454 U | 7/2013 |

(Continued)

OTHER PUBLICATIONS

Machine Translation of WO2015158947A1 (Year: 2015).*

(Continued)

*Primary Examiner* — Rachid Bendidi
*Assistant Examiner* — Andrew J Cromer
(74) *Attorney, Agent, or Firm* — Brandon Hicks; Eversheds Sutherland (US) LLP

(57) ABSTRACT

A personal mobility vehicle comprising a control unit for controlling a steering function of the vehicle, wherein the control unit is adapted to receive route information from a personal smart device and to control the vehicle at least semi-autonomously based on the route information.

17 Claims, 20 Drawing Sheets

(51) Int. Cl.

| | |
|---|---|
| *H04W 4/029* | (2018.01) |
| *H04N 7/18* | (2006.01) |
| *H02J 7/00* | (2006.01) |
| *B62K 5/007* | (2013.01) |
| *H04W 12/71* | (2021.01) |
| *B62J 45/10* | (2020.01) |
| *B62J 43/16* | (2020.01) |
| *B62J 43/20* | (2020.01) |

(52) U.S. Cl.
CPC ...... *B62K 2202/00* (2013.01); *B62K 2204/00* (2013.01)

(56) References Cited

U.S. PATENT DOCUMENTS

| | | | |
|---|---|---|---|
| 2013/0151111 A1* | 6/2013 | Skelton | B60R 16/02 701/99 |
| 2014/0091543 A1 | 4/2014 | Menard et al. | |
| 2015/0120089 A1* | 4/2015 | Peel | B60T 7/02 701/2 |
| 2015/0127208 A1 | 5/2015 | Jecker et al. | |
| 2015/0321722 A1* | 11/2015 | Dadoosh | B60L 53/66 180/208 |
| 2015/0338849 A1* | 11/2015 | Nemec | B60W 50/082 701/25 |

FOREIGN PATENT DOCUMENTS

| | | |
|---|---|---|
| DE | 3128112 A1 | 2/1983 |
| DE | 102007037588 A1 | 2/2009 |
| GB | 2478940 A | 9/2011 |
| GB | 2548226 A | 9/2017 |
| JP | H10-230879 A | 9/1998 |
| JP | 2002-225718 A | 8/2002 |
| SE | 520767 C2 | 8/2003 |
| WO | 2004/031016 A1 | 4/2004 |
| WO | 2015/059662 A1 | 4/2015 |
| WO | WO-2015158947 A1 * | 10/2015 ............... B62B 9/00 |

OTHER PUBLICATIONS

Search and Examination issued in United Kingdom Application No. 1807480.7, dated Oct. 2, 2018 (8 pages).

Hardesty, L., Nov. 7, 2016, "Driverless-vehicle options now include scooters", MIT News, [online], available from http://news.mit.edu/2016/driverless-scooters-1107 [accessed Sep. 28, 2018] (3 pages).

Zelenko, M., Jun. 6, 2016, "On the road with George Hotz's $1,000 self-driving car kit", TheVerge, [online], available from: https://www.theverge.com/2016/6/6/11866868/comma-ai-george-hotzinterview-self-driving-cars [accessed Sep. 28, 2018] (8 pages).

* cited by examiner

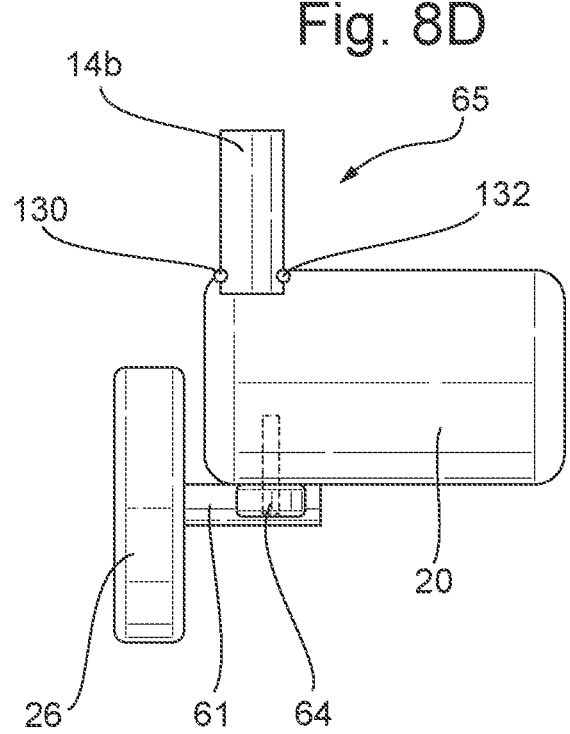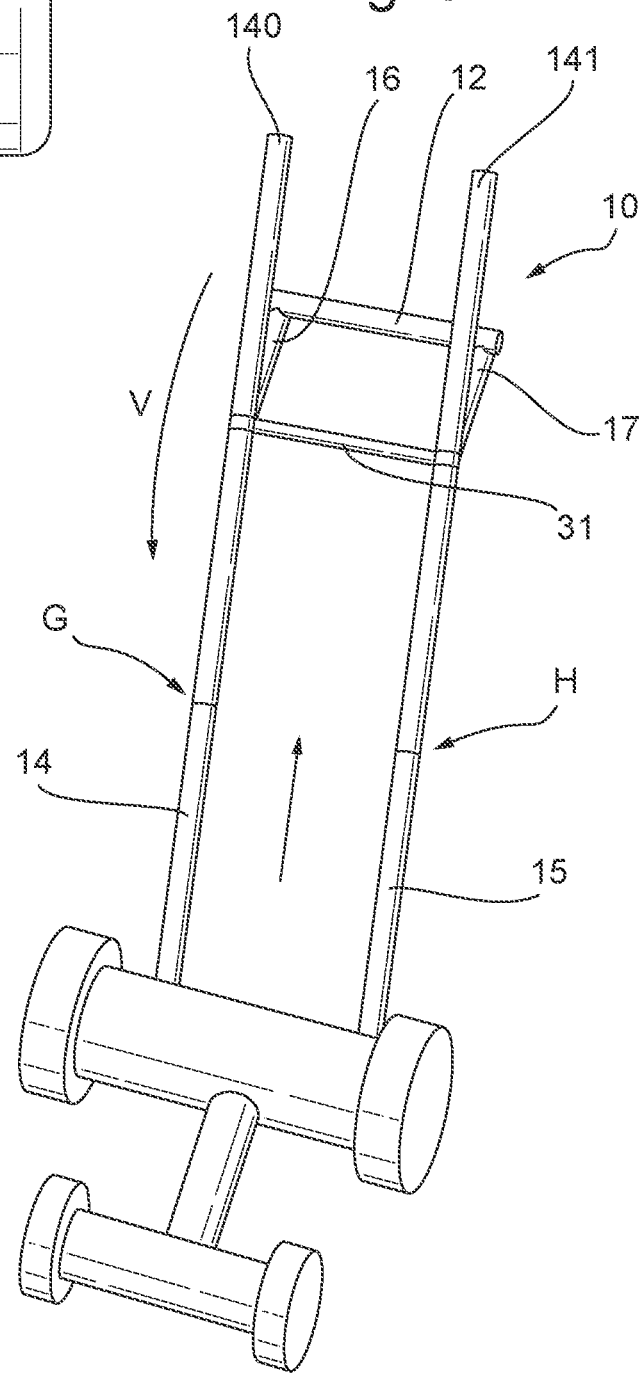

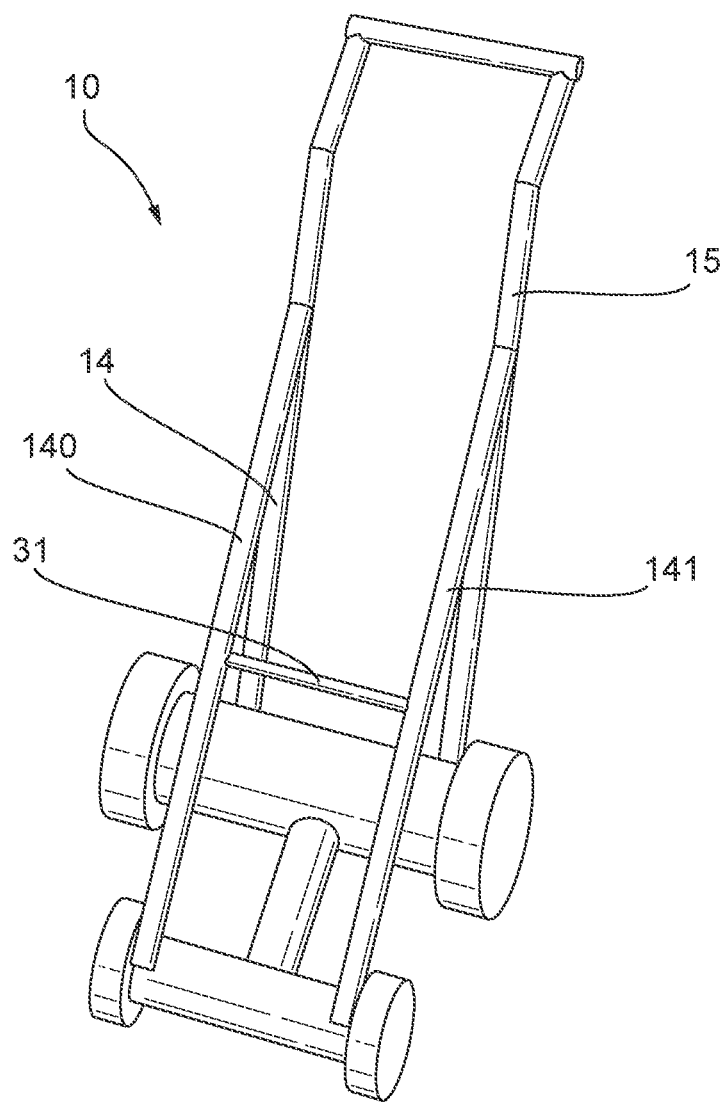

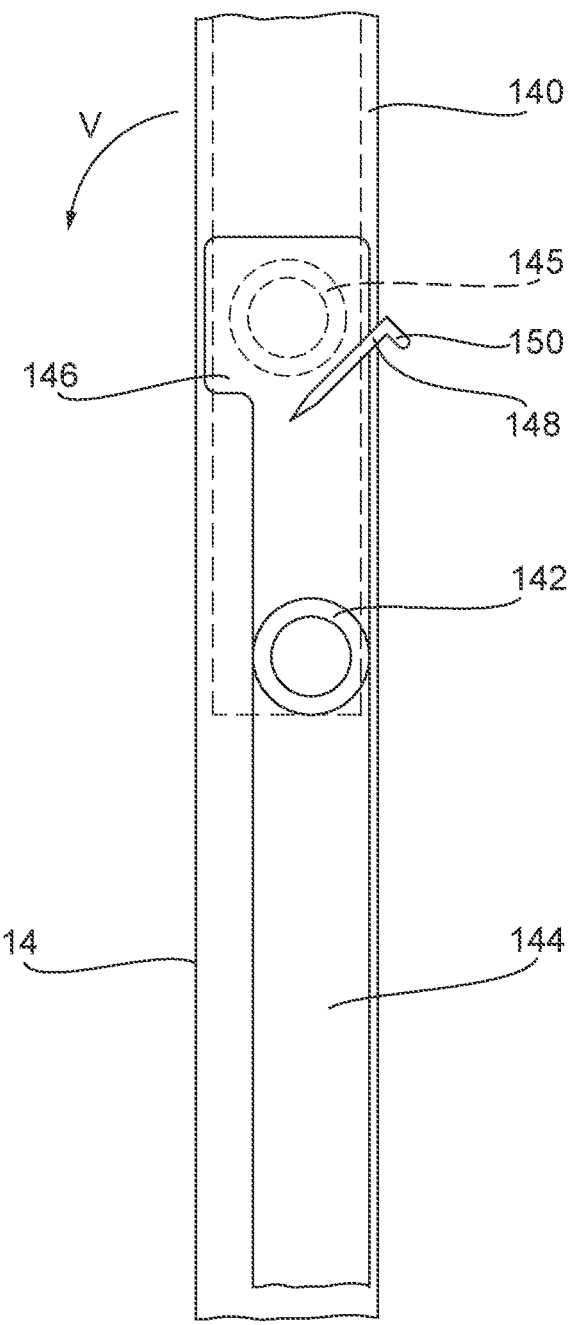

PERSONAL MOBILITY VEHICLE

CROSS-REFERENCE TO RELATED APPLICATIONS

This application claims priority to and the benefit of United Kingdom patent application No. 1807480.7, filed May 8, 2018, which is hereby incorporated by reference herein in its entirety.

The present invention relates to a personal mobility vehicle, for example a driveable scooter or powered wheelchair.

BACKGROUND

As future global populations migrate to more urban environments mobility in these areas becomes increasingly difficult, complex, and regulated. Commuters, the elderly, families, and business may face challenges travelling to and within, and operating in, cities. Additionally, space in such areas may become increasingly scarce and businesses and families may face new space constraints, for example reduced storage or garage space in urban areas.

Accordingly, there is a need for improved mobility products that allow consumers to meet various needs at different life stages, while minimising the space required to store such products.

SUMMARY OF INVENTION

According to a first arrangement, there is provided a personal mobility vehicle comprising a control unit for controlling a steering function of the vehicle, wherein the control unit is adapted to receive route information from a personal smart device and to control the vehicle at least semi-autonomously based on the route information.

The personal mobility vehicle may further comprise a holder for retaining the smart device.

The holder may comprises a charging connection for charging the smart device. The charging connection may connect the smart device to a source of electrical power automatically, whilst the smart device is docked in the holder. The source of electrical power may comprise a battery pack for powering the vehicle.

The smart device may be a smart phone.

The smart device may connect wirelessly to the control unit.

The smart device may connect via Bluetooth® to the control unit.

The control unit may be programmed to recognise at least one authorised smart device.

The control unit may be configured to disable the vehicle until an authorised smart device is docked in the holder.

The control unit may be configured to record which authorised smart device is docked, and may store this information in a memory.

The control unit may record details of journeys undertaken and which authorised smart device is docked during those journeys.

The control unit may control a drive motor of the vehicle.

The control unit may control the instantaneous maximum speed of travel of the vehicle dependent on location data provided by the smart device. A driver of the vehicle may control the speed of the vehicle up to the maximum speed of travel.

The vehicle may be provided with at least one sensor and data from that sensor may be sent by the control unit to the smart device during a journey and may be stored by the smart device. The at least one sensor may comprise a camera and data from the camera may comprise video footage of the journey.

According to the above arrangement, a user can pre-program their smart device with route information, so that when the smart device is in communication with the control unit, the personal mobility vehicle is immediately ready to drive to the desired location. The smart device may be loaded with an app which allows a user to select and receive route information for one or more journeys. In a commercial application, the app might receive route information from a remote control centre, which route information is used to navigate the vehicle to one or more pick up or delivery locations. The vehicle may be controlled by a user or may operate autonomously or semi-autonomously (eg acting independently to some degree).

According to second arrangement, there is provided a transport device comprising a chassis and a frame, the frame comprising a first strut and a second strut, wherein the second strut is movably connected to the first strut, wherein the second strut is movable between a stowed position and a deployed position in which it braces the frame relative to the chassis, and wherein the first strut comprises a recess adapted to accommodate the second strut in its stowed position The recess may comprise a hollow interior of the first strut.

The hollow interior of the first strut may contain a rail or track which guides a first end of the second strut as it is moved from its stowed position to its deployed position.

The first end of the strut may be provided with a guide wheel which engages the track.

The second strut may be pivotably connected to the first strut.

The second strut may be connected to the first strut at or adjacent its first end only.

In the deployed position the second strut may be releasably attached to the chassis of the transport device.

The first strut may comprise a handlebar member. The transport device may further comprise a control means mounted on the handlebar member.

The first strut may comprises a first strut portion and a second strut portion movably connected to the first strut portion, wherein the first strut is movable between an extended position in which the first and second strut portion are aligned along a common axis, and a folded position in which the second strut portion is at an angle with respect to the first strut portion.

In the folded position, the second strut portion may be substantially parallel to a chassis member of the transport device.

The frame may further comprise retaining means for retaining the second strut portion when the first strut is in the folded position. The retaining means may connect the first strut portion to the second strut portion.

The transport device may further comprise releasable fixings such as ISOFIX anchor points for retaining another object on the transport device. The object may comprise at least one of a platform, cot, basket, cargo bed and seat.

According to the above arrangement, the transport device may be packed away when not in use in a very compact configuration. Also when the second struts are not in use they can be safely stowed away in the first struts and are always readily available to be deployed when needed, for example when a child seat or cot is to be attached to the chassis or any other appropriate part of the transport device.

According to a third arrangement, there is provided a transport device comprising a battery or battery pack, and a chassis member at least partially encased in the battery.

The battery may be removeably attached to the chassis member.

The battery may comprises the chassis member.

The battery may provide structural support for the transport device.

The battery pack may reinforce the chassis member, or may otherwise carry structural load.

The battery may have a substantially C-shaped cross section.

The battery may be formed in two halves which are fixed together around the chassis member.

The battery may be substantially tubular. For example, it may be substantially cylindrical.

According to a forth arrangement, there is provided a method of fitting a battery to a transport device, the method comprising at least partially encasing a chassis member of the transport device with the battery.

The battery may be removeably attached to the chassis member.

The battery may comprises the chassis member.

The battery may provide structural support for the transport device.

The battery pack may reinforce the chassis member, or may otherwise carry structural load.

The battery may have a substantially C-shaped cross section.

The battery may be formed in two halves which are fixed together around the chassis member.

The battery may be substantially tubular. For example, it may be substantially cylindrical.

The step of attaching the battery pack to the structural member may comprise bonding the battery pack to the structural member. For example, the step of bonding the battery pack to the structural member may comprise gluing the battery pack to the structural member with adhesive.

According to the above arrangements, the space taken up by the battery or battery pack is minimized, and the battery or battery pack can support and protect the chassis member. Where desirable, the battery or battery pack can be configured to contribute to the structural integrity of the transport device, so that the chassis itself can be made lighter.

The transport device may provide a multi-use modular vehicle which can replace multiple products and allow businesses or consumers to meet various needs with a single product. For example, such a vehicle can meet a passenger's mobility needs and assist in carrying cargo such as luggage, a cot or shopping bags. The device also has many commercial applications.

DESCRIPTION OF FIGURES

For a better understanding of the invention, and to illustrate how it may be put into effect, reference is now made, by way of example only, to the accompanying figures in which:

FIGS. 8A-D are schematic views of components of an example transportation device;

FIGS. 9A-B are schematic views of a further example of a transportation device;

FIGS. 9C-F are schematic views of components of an example transportation device;

DETAILED DESCRIPTION

Figure 1:
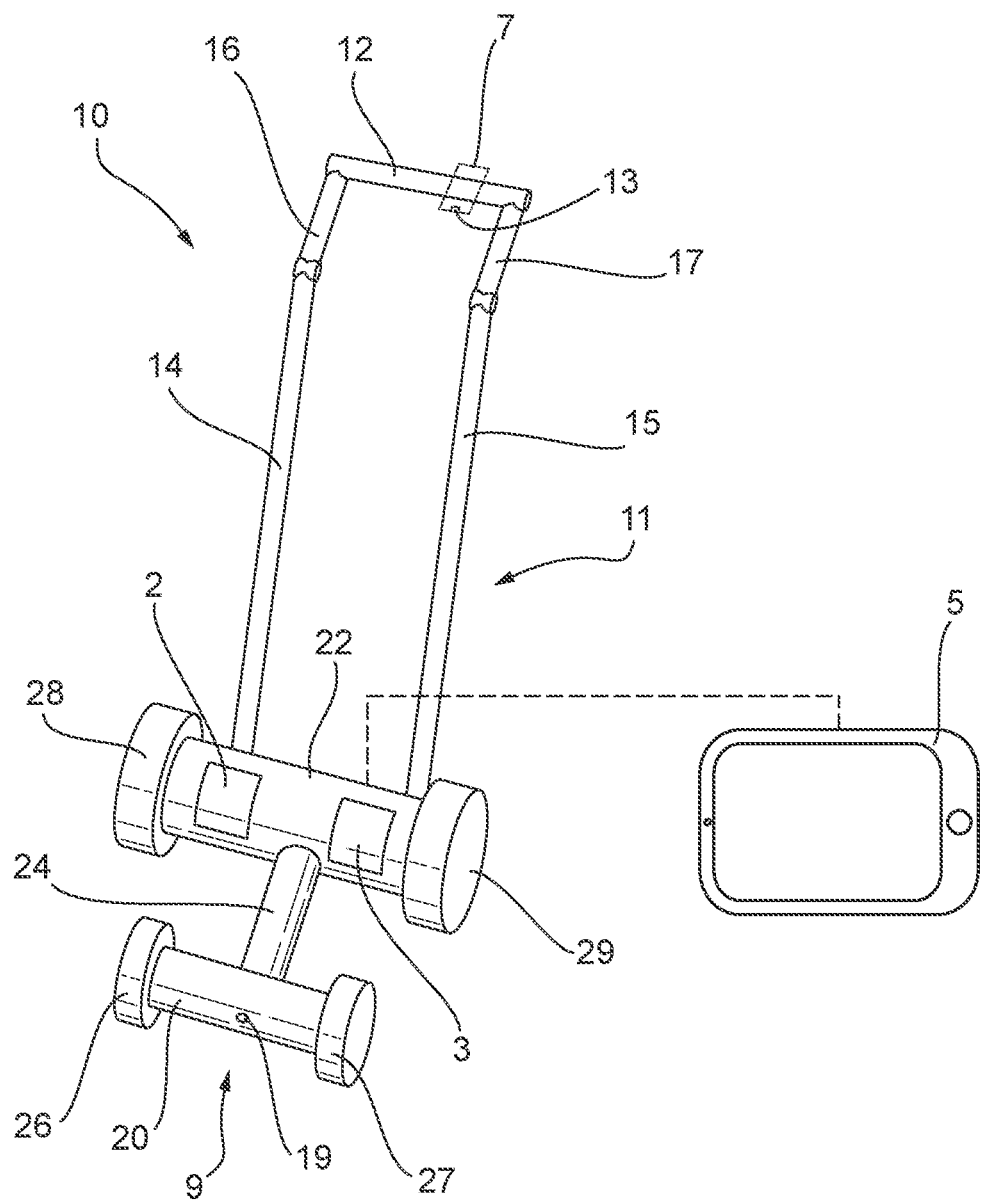
FIG. 1 is a schematic view of one example of a transportation device.

FIG. 1 shows one example of a transportation device, in the form of a personal mobility vehicle 10. The personal mobility vehicle 10 comprises at least one motor 2 and a control unit 3 for controlling the vehicle 10. The control unit 3 is adapted to receive route information from a smart device 5. The smart device 5 may be provided on the personal mobility vehicle 10 (hereafter "vehicle 10"). Alternatively, it may be remote from the vehicle 10.

The vehicle 10 comprises a chassis 9 and frame 11. Frame 11 is attached to and extends from chassis 9. At a distal end of the frame 11 (the end remote from the chassis 9) frame 11 comprises a handlebar member 12. As will be discussed later the handlebar member 12 may comprise a means for directing or controlling the vehicle 10.

Frame 11 comprises two struts, strut 14 and strut 15, and two arms 16, 17. Strut 14 is disposed between the chassis 9 and arm 16 and strut 15 is disposed between chassis 9 and arm 17. Handlebar member 12 extends between the two arms 16, 17. The handlebar member 12 may be movably attached to one arm 16, 17 or both arms 16, 17. In one example, the two arms 16, 17 may be omitted and handlebar member 12 may join struts 14 and 15, and elements 12, 14 and 15 may therefore be of a single, unitary construction.

For accommodating smart device 5 on the vehicle 10, a holder 7 may be provided for retaining the smart device 5. Holder 7 may be provided on the handlebar member 12 and may be provided with a charging connection 13, which may operate to charge the smart device 5 when it is in the holder 7. Holder 7 may be integral with or removably attached to handlebar member 12. Holder 7 may be provided on any part of frame 11 or part of vehicle 10.

One or more sensors 19 may be provided on the vehicle 10. In the illustrated embodiment the sensor 19 comprises a forward facing camera which can be used to film a journey and send data to the smart device 5 for recordal by the smart device.

Vehicle 10 comprises a first housing unit 20 and a second housing unit 22. First and second housing units 20, 22 may be connected by a third housing unit 24. Vehicle 10 comprises a first wheel set that comprises first and second wheels 26, 27 located at either end of housing unit 20. Vehicle 10 comprises a second wheel set comprising third and fourth wheels 28, 29 located at either end of housing unit 22. Chassis 9 comprises a structure, at least part of which may be contained within the first housing unit 20 and/or second housing unit 22, and/or third housing unit 24. In one example the first housing unit 20 and/or the second housing unit 22 and/or third housing unit 24 may comprise a structural element, and form at least part of the chassis 9. In other examples the chassis 9 comprises a distinct structural element disposed at least partially within the first, second, and/or third housing units 20, 22, 24. For example, a structural element such as a base plate, beam, rail or support may be provided at least in part within first, second or third housing units 20, 22, 24.

It will be appreciated that power to move the wheels may be provided by the motor 2, and the motor 2 may be controlled by a motor control unit 3. Motor 2 may provide power to only one set of wheels or all four wheels. Accordingly, vehicle 10 may be front-wheel drive, rear-wheel drive, or four-wheel drive. One or more motors 2 may be provided in first housing unit 20, second housing unit 22, or third housing unit 24.

Figure 2:
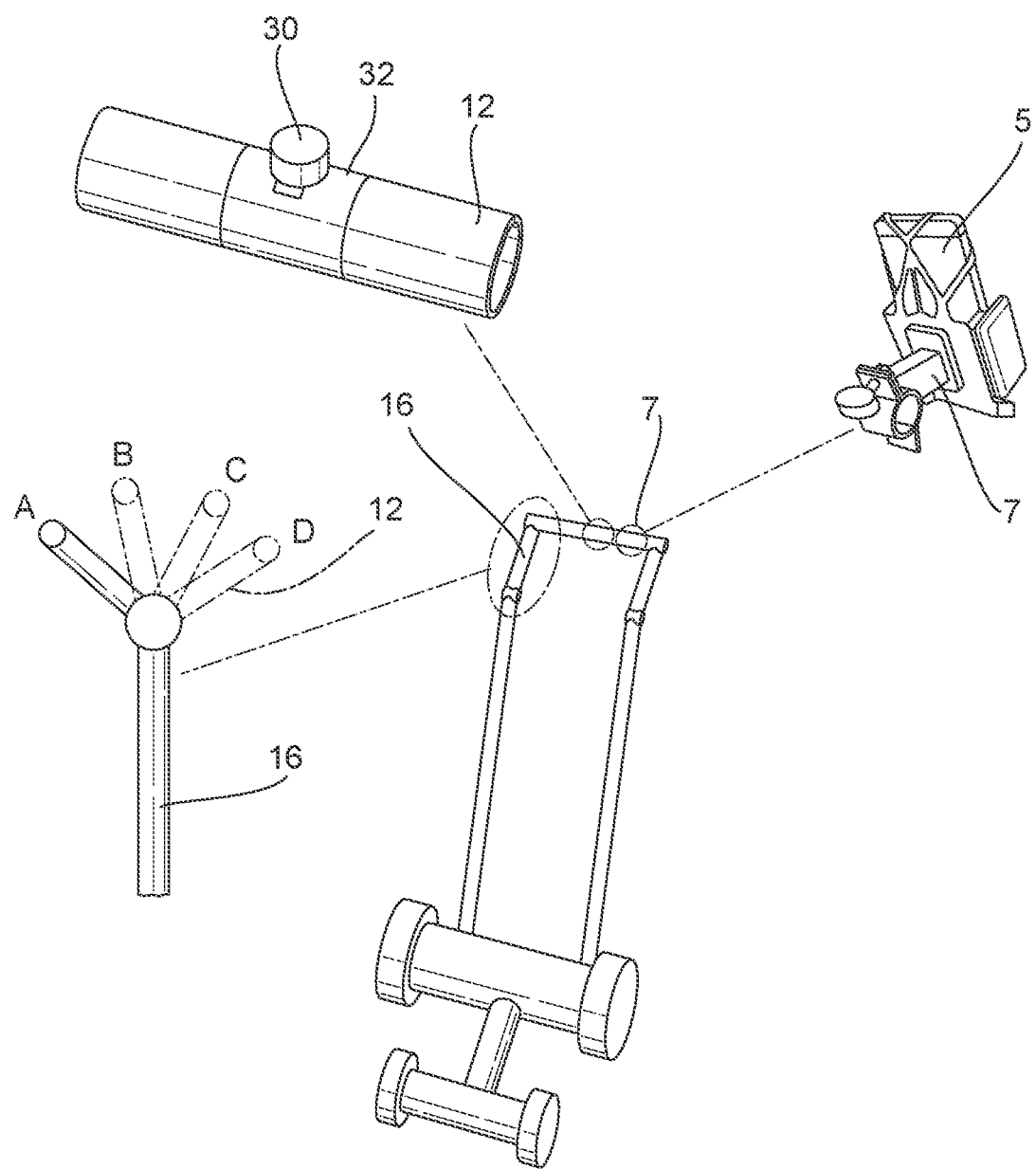
FIG. 2 is a schematic view of a further example of a transportation device.

FIG. 2 shows one example of vehicle 10 in which certain elements are shown in further detail. Specifically, there is shown an enlargement of the holder 7, a portion of the handlebar member 12, and arm 16. Arm 16 is movable between and to a range of positions, schematically shown in FIG. 2 and indicated by the letters A, B, C and D. Only a sub-range of the possible orientations of arm 16 are indicated. It is contemplated that in an alternative arrangement (not illustrated) the arm 16 may be 360-degree movable; i.e. arm 16 may be rotated to any rotational position. The same, or similar, movement may be exhibited by arm 17.

Holder 7 for a smart device is shown in an off-centre position on the handlebar member 12. In FIG. 2, smart device 5 is represented as a smart phone. However any smart device is within the scope of this disclosure.

A thumb wheel 30 is mounted in the centre portion 32 of handlebar member 12. Thumb wheel 30 may be rotatable (i.e. by the user's thumb or other finger) to control the vehicle 10. In one example, thumb wheel 30 may be a direction-of-travel control means. In this example movement of the thumb wheel 30 may control the direction of the first wheel set 26, 27 or the second wheel set 28, 29. Accordingly, the vehicle 10 may be front or rear wheel steerable with the direction of travel being controlled by the user via the thumb wheel 30. In another example, thumb wheel 30 may be a speed-of-travel control means. In this example movement of the thumb wheel 30 may control at least one of the speed of the first wheel set 26, 27 and the speed of the second wheel set 28, 29.

Any type of movement of the thumb wheel 30 to control the vehicle 10 is contemplated. By way of example, the thumb wheel 30 may be rotatable. In this example, clockwise and anticlockwise movement of the thumb wheel 30 may correspond to movement of both wheels in either the first wheel set or the second wheel set. Clockwise movement of the thumb wheel 30 may correspond to both wheels in either set moving left with respect to the chassis 9, or right with respect to the chassis 9. Alternatively, anticlockwise movement of the thumb wheel 30 may correspond to both wheels in either set moving left with respect to the chassis 9, or right with respect to the chassis 9. In another example, movement of the thumb wheel 30 may correspond to an increase in speed, or a decrease in speed. In a further example, the thumb wheel 30 may be moveable continually or discretely between limit positions.

In one example the thumb wheel 30 may be rotated through angles of up to 180 degrees. In other examples, the thumb wheel 30 may be rotated through a 90-degree or 270-degree angle.

In a further example, means for controlling the vehicle 10 may be provided in place of the thumb wheel. For example, such vehicle control means may comprise a joystick. Movement of the joystick may control the direction of any of the wheels and buttons on the joystick may control the vehicle's speed. Alternatively, both the direction and the speed of the wheels may be controlled by movement of the joystick.

Thumb wheel 30 may be rotatable and movable (e.g. tiltable). Rotation of the thumbwheel may control the vehicle's direction (or speed) and movement (e.g. a tilting movement) of the thumbwheel 30 may control the vehicle's speed (or direction).

Figure 3:
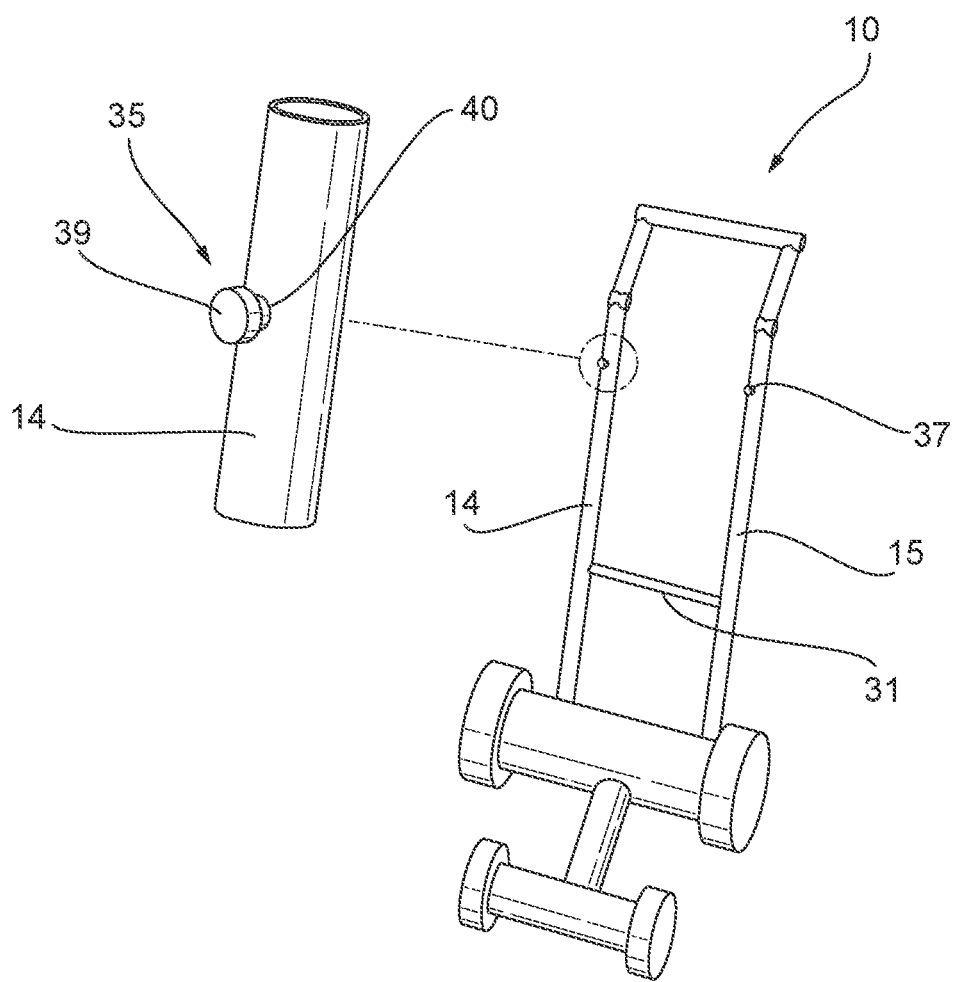
FIG. 3 is a schematic view of a further example of a transportation device.

FIG. 3 shows an example vehicle 10, and an enlargement of a portion of an example strut 14. Each strut 14 and 15 comprises a stud. Strut 14 comprises a stud 35 and strut 15 comprises a stud 37. The enlargement shows the portion of strut 14 comprising stud 35 in further detail. Stud 35 comprises a head 39 and stem 40. Head 39 is located at one end of the stem 40. Stud 35 protrudes from the strut 14 such that the stem 40 connects the head 39 of the stud and strut 14. Stud 37 in strut 15 may be configured in the same or a similar way. Head 39 may be of substantially circular cross-section.

Studs 35 and 37 provide a mechanism for another object to be removably attached to vehicle 10. For example, a baby seat, shopping basket, bassinette, demountable cargo body etc. may be attached to the vehicle 10 via studs 35, 37.

A further strut 31 may connect struts 14 and 15.

Figure 4A:
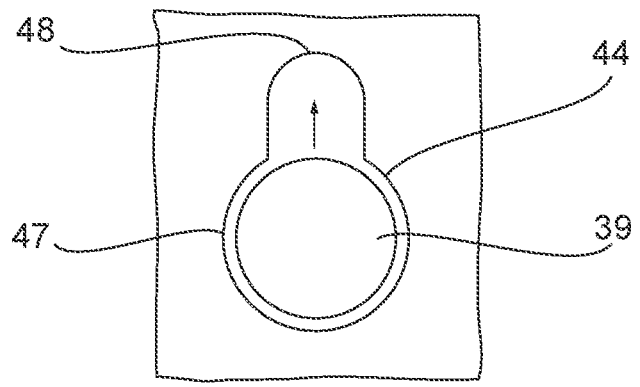
FIGS. 4A and 4B are schematic views of example mechanisms to secure another article to a transportation device.
Figure 4B:
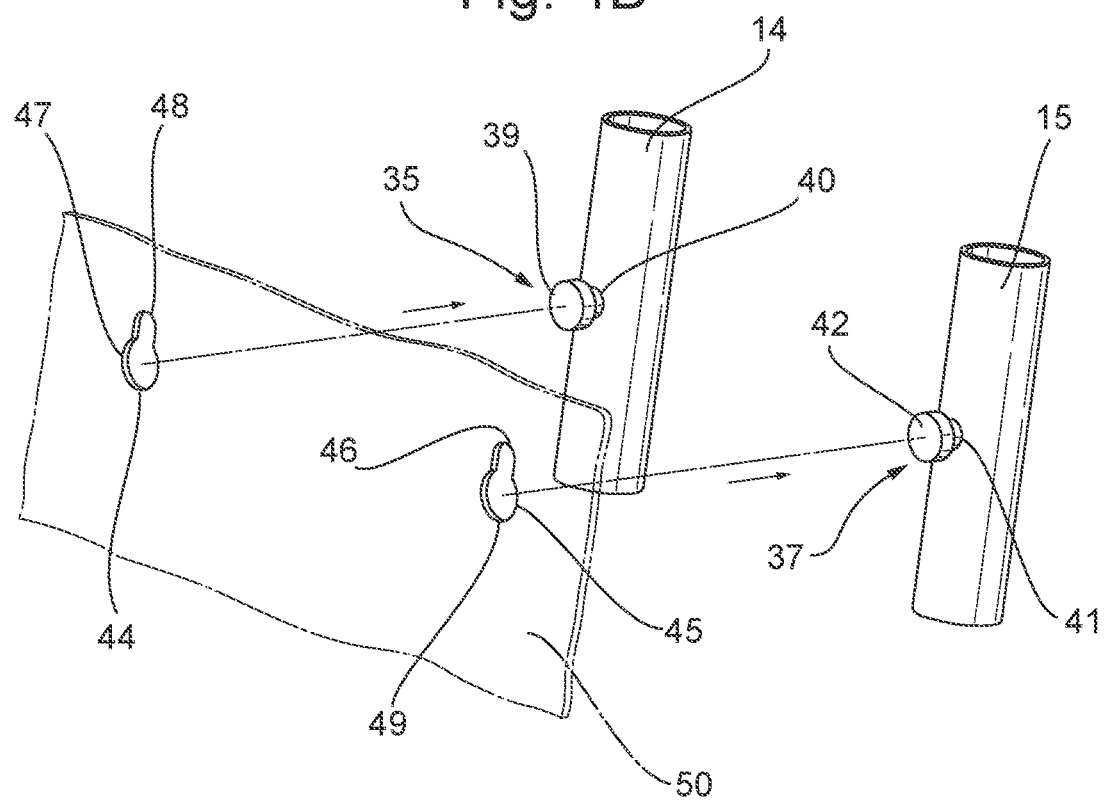

FIGS. 4A and 4B show an example mechanism via which an object 50 such as a demountable cargo body may be secured to vehicle 10 at one or more of its struts 14, 15. Object 50 comprises a pair of holes 44. Each hole 44 comprises a first hole portion 47 and a second hole portion 48. First hole portion 47 is of increased dimension relative to the second hole portion 48. Second hole portion 48 is therefore smaller, or narrower, than the first hole portion 47. The first and second hole portions 47, 48 may be substantially circular, in which case the diameter of the first hole portion 47 is larger than the diameter of the second hole portion 48.

Second hole portion 48 may be substantially semi-circular. The diameter of the second hole portion 48 may be substantially equal to the diameter of the stem 40 of stud 35. As shown in FIG. 4A, to secure an object 50 to the vehicle 10 the hole 44 of the object 50 may be placed over the stud 35. First hole portion 47 of the hole 44 is placed over the head of the stud 35 and then the object 50 is displaced slightly so that the second hole portion 48 slides on to the stem 40 of stud 35. If the diameter of the second hole portion 48 is substantially equal to the diameter of the stem 40, the object 50 is retained on the vehicle 10 by a friction-fit between the second hole portion 48 of hole 44 and the stem 40 of the stud 35. Second hole portion 48 therefore engages stud 35 to releasably attach the object 50 to the vehicle.

As shown in FIG. 4B, an object 50 may comprise two holes 44, 45 and therefore may be removably attached to both struts 14, 15 of vehicle 10. Stud 37 on strut 15 comprises stem 41 and head 42. Hole 45 in object 50 comprises first hole portion 46 and second hole portion 49, with the first hole portion 49 being larger than the second hole portion 46.

To removably secure object 50 to vehicle 10, object 50 is oriented such that holes 44, 45 are placed over the heads 39, 42 of studs 35, 37, respectively. The object 50 is then displaced downwardly slightly so that second hole portions 48, 46 engage stems 40, 41 of studs 35, 37, respectively. Engagement between the holes 44, 45 (second hole portions 48, 46) and the studs 35, 37 (at their stems 40, 41) may be a friction-fit. Alternatively, the hole portions 48, 46 may be shaped to provide a snap-fit.

In another example, the struts 14, 15, or any other appropriate part of the vehicle, could comprise holes instead of studs and the other object 50 could be attached to the vehicle via releasable fixings such as screws or bolts.

In yet another example, the struts 14, 15, or any other appropriate part of the vehicle, could be provided with ISOFIX anchor points. ISOFIX, known as LATCH (Lower Anchors and Tethers for Children) in the United States, is the current international standard for attachment points for child safety seats in vehicles. The object 50 could then be provided with cooperating ISOFIX anchor points, so that the object 50 can be secured quickly and safely to the vehicle. This arrangement is particularly advantageous where the object 50 is a cot or child seat, but could be used with any other object 50 fitted with cooperating ISOFIX fittings, such as a demountable cargo body. Where the vehicle may be provided with demountable/replaceable bodies, and one of those bodies may be a child seat or cot, the vehicle controller may be switched into a controlled speed mode in which the maximum speed of the vehicle is limited when the presence of a child seat or cot has been detected or has been input to the controller by a user. In one arrangement, the child seat or cot is provided with an electronic tag which is detected by a sensor on the vehicle when the child seat or cot is installed. On detection of the tag, the controller switches to the controlled speed mode.

Figure 5A:
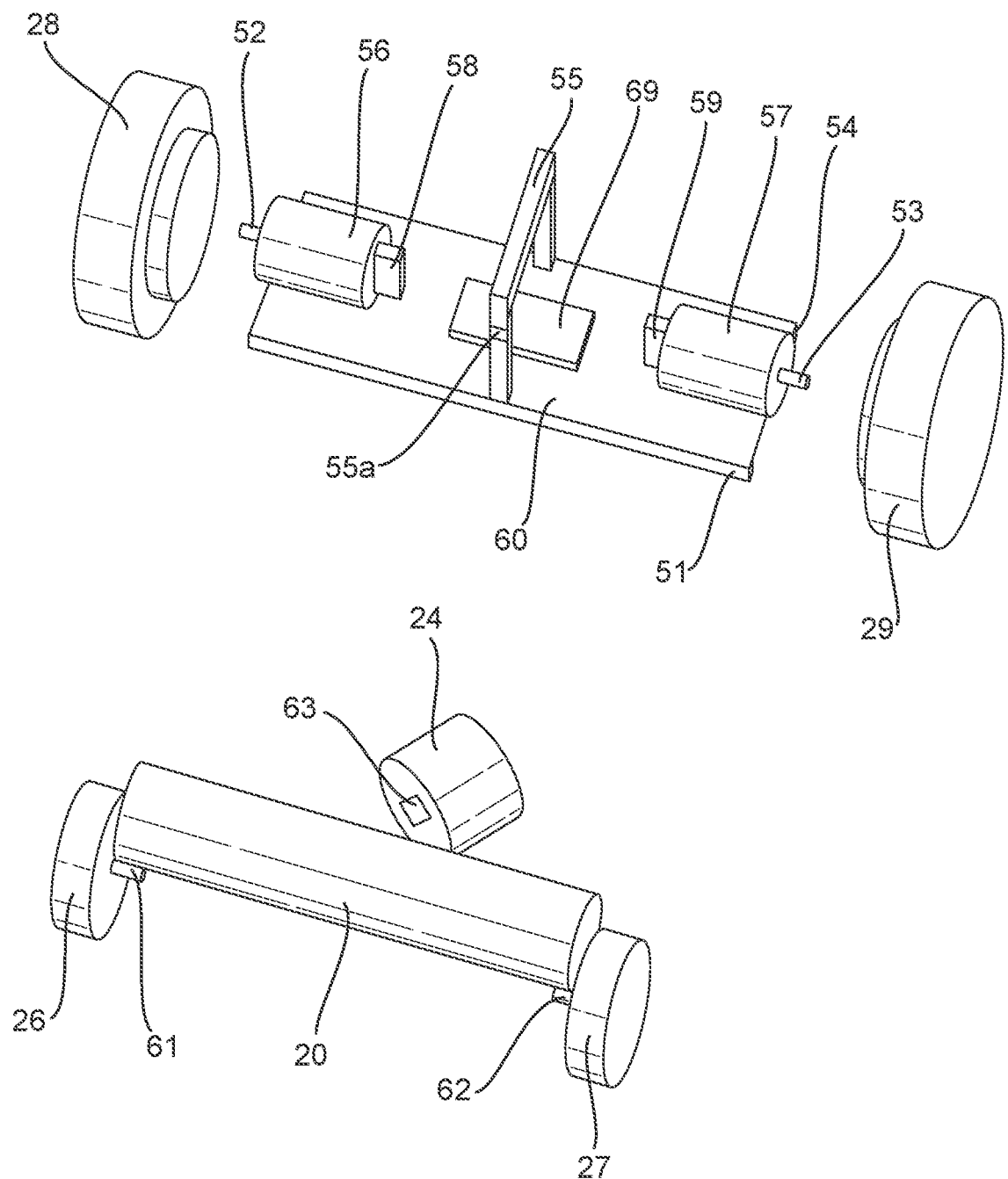
FIG. 5A is a schematic view of components of an example transportation device.

FIG. 5A schematically shows an example chassis 9 of the vehicle 10. Only a section of third housing unit 24 is shown, and interior components of an example second housing unit 22 are shown. The first wheel 26 is rotatably mounted on axle shaft 61 and second wheel 27 is rotatably mounted on axle shaft 62. As will be described later, each axle shaft 61, 62 is connected to first housing unit 20. A bushing, bearing or any suitable rotary connection may be used to achieve connection between the axles and the wheels such that the wheels may rotate with, around, or relative to the axle shafts. A part (not shown) of the chassis 9 may be contained in first housing unit 20. To turn the wheels 26, 27, a steering mechanism (not shown) may be provided, for example within housing unit 20, and may be connected to a vehicle control means on the handlebar member with movement of the vehicle control means turning wheels 26, 27 via steering mechanism. For example the steering mechanism may comprise a conventional electrically actuated rack connected by steering arms by tie rods and each axle shaft 61, 62 may be connected to the housing 20 through a conventional King pin mechanism.

A cutaway of third housing unit 24 is shown. Chassis 9 comprises a beam 63 contained within third housing unit 24. Beam 63 may join first and second housing units 20, 22. Beam 63 may also join a part of the chassis 9 contained in the first housing unit 20 to part of the chassis 9 contained in second housing unit 22 (not shown), e.g. rail 51 and/or 54 to be described below.

As shown in FIG. 5A, third wheel 28 is mounted on an axle shaft 52 and fourth wheel 29 is mounted on an axle shaft 53. Axle shaft 52 may comprise the drive shaft of motor 56 and axle shaft 53 may comprise the drive shaft of motor 57.

In this example motors 57 and 56 are provided to power wheels 28, 29 directly and may be controlled by motor control units 59 and 58, respectively.

Chassis 9 comprises a base plate 60 to which motors 56, 57 are mounted. Chassis 9 also comprises housing support 55 attached to base plate 60, and rails 51, 54 attached to the base plate 60. It will be appreciated that the elements 60, 52 and 54 form part of second housing unit 22. Therefore, at least part of the chassis 9 may be formed by the housing unit 22.

Motors 57, 56 may be electric motors. One or more of the first, second and third housing units 20, 22, 24 may constitute a removable battery pack to power the motors. At least part of the chassis 9 may be at least partially contained within a battery pack which may be removable from the vehicle 10.

Motor control units 59, 58 are schematic representations of units that direct power to motors 57, 56 to rotate axle shafts 52, 53 to turn wheels 28, 29. The motors 57, 56 may be provided with respective reduction gear boxes so as to cause wheels 28, 29 to rotate at the desired speed. The motor control units 59, 58 may be used to provide direction control and may control the direction of rotation and relative speed of rotation of the wheels 28, 29. A vehicle control unit 69 may be in communication with motor control units 59, 58, and smart device 5, so that the vehicle control unit 69 controls the direction and speed of each wheel 28, 29 and therefore the direction of the vehicle 10 based on received route information from smart device 5. In one example, only a single vehicle control unit 69 may be provided to control motors 56, 57.

Beam 63 may be joined to rail 51 or may be joined to support 55, for example by means of welding at the area labelled 55*a*. Rails 51, 54, beam 63, base plate 60 and/or support 55 may be considered to be structural elements of the chassis 9 and may be made of steel or of lightweight material, such as aluminium or magnesium alloy.

Motors 57, 56 may be bidirectional motors. In one example, a single motor may be used and may be connected through a differential to two half-shafts connected to respective axle shafts. A motor control unit may therefore control a single motor that drives both wheels. A single control unit, for example a speed control unit, or a direction control unit, may be used for controlling the speed or direction of both wheels 28, 29.

Referring again to FIG. 2, movement of thumb wheel 30 may influence motor control units 58, 59 and, in turn, the speed of the wheels. Movement of thumb wheel 30 may in addition or instead influence a direction control unit and, in turn, the direction of the wheels.

First and second wheels 26, 27 (the first wheel set) may be driven wheels, driven by third and fourth wheels 28, 29 (the second wheel set) which may be considered drive wheels. In another example, the same or a separate motor may be provided for one or both of the first and second wheels and the vehicle 10 may be a four-wheel drive vehicle.

Depicted in FIG. 5A, each of the third and fourth wheels 28, 29, has a motor 57, 56. The vehicle control unit, schematically indicated by 61, may control one or both motors 57, 56. With reference to FIG. 1 vehicle control unit 69 is adapted to receive route information from a smart device 5 and to control at least one of the motors 57, 56. In addition, motor control units 59, 58 may be controlled by the vehicle control unit 69. Accordingly, motor control units 59, 58 may be influenced by the route information received by vehicle control unit 69. In another example, wheels 26, 27 may be controlled by a steering mechanism which may be in communication with a smart device 5. The steering mechanism may be adapted to receive route information from the smart device 5 so that the direction of the vehicle can be influenced by the route information. The vehicle 10 may therefore be semi or fully autonomously controlled.

Figure 5B:
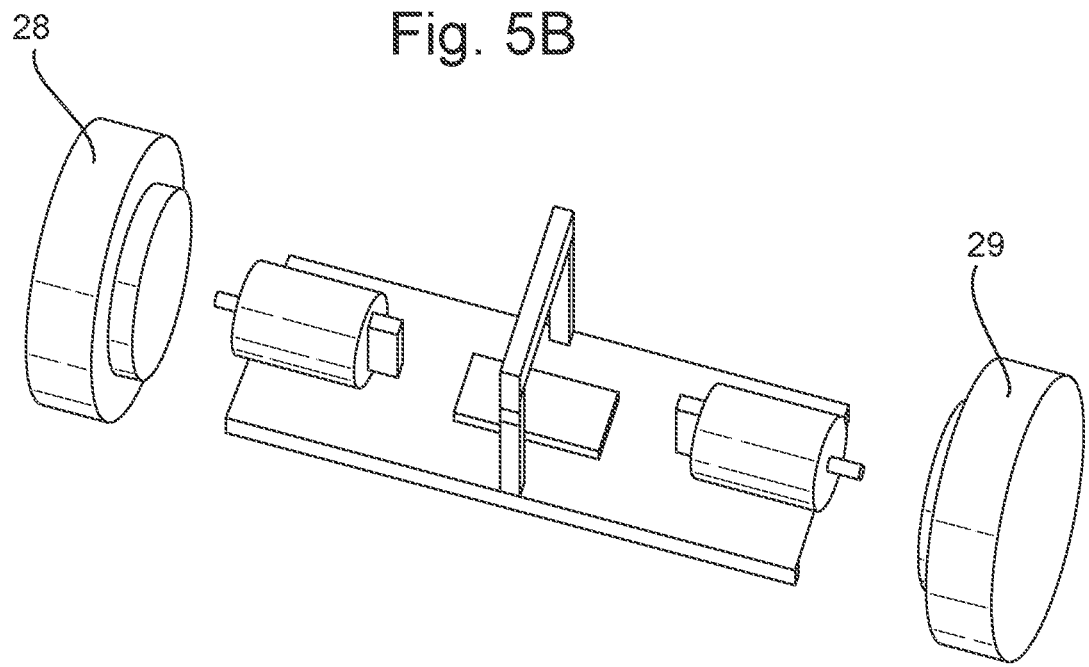
FIG. 5B is a schematic view of components of an example transportation device.
Figure 5B:
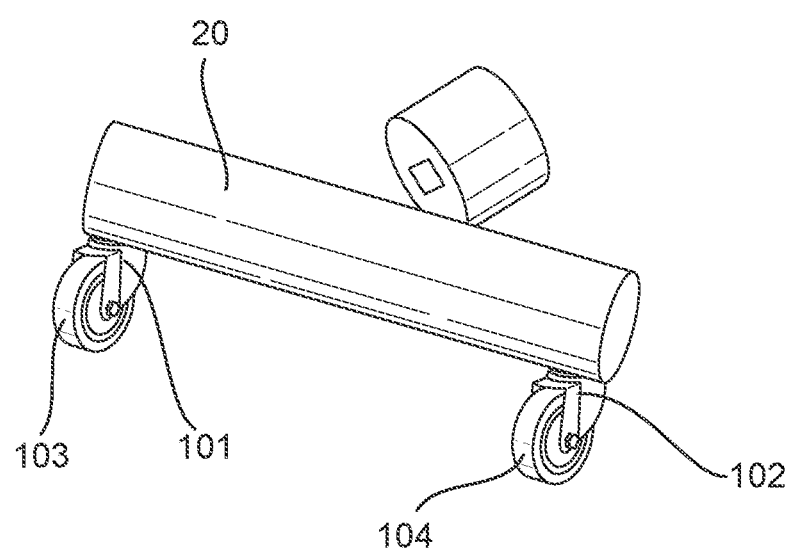

FIG. 5B shows another example of a first wheel set of the vehicle 10 in which the steered wheels form part of a "passive" steering arrangement. The first wheel set comprises castor assemblies 101 and 102. First wheel 103 is rotatably mounted on the castor assembly 101 which is itself rotationally mounted to the first housing unit 20. Similarly, second wheel 104 is secured to second castor assembly 102 which is itself rotationally mounted to the first housing unit 20.

The wheel configuration of FIG. 5B allows the wheels 103, 104 in the first wheel set to be driven or slave wheels, which rotate as the vehicle 10 moves under the action of wheels 28, 29 in the second wheel set, which are drive wheels in this example. Driven wheels 103, 104 may therefore be of the castor-wheel type, which will passively swivel to allow the vehicle 10 to turn, for example when wheels 28, 29 move in opposing directions to carry out a "spot-turn" manoeuvre. It will be appreciated that, in use, either the first or second wheel set may be the front wheels of the vehicle 10. Wheels 28, 29 may each be controlled by a bi-directional motor and so the vehicle 10 may be driven in either direction.

It will also be appreciated that the vehicle 10 may be steered according to an "active steering arrangement" schematically illustrated in FIG. 5A in which the vehicle 10 comprises a steering mechanism to actively turn each of wheels 26 and 27 together. Alternatively, as mentioned above, the vehicle 10 may be steered according to a "passive steering arrangement" schematically illustrated in FIG. 5B in which the vehicle 10 comprises castor wheels 101, 102 that passively turn when drive wheels 28, 29 are powered differentially to turn the vehicle 10. In this example drive wheels 28, 29 may be influenced by route information received by a smart device 5 in communication with a unit that controls the wheels so that the vehicle 10 may be semi or fully autonomously controlled. For example, route information may require the vehicle 10 to change its direction, in which case a vehicle control unit 69 may cause the drive motors to be driven at different speeds to cause the vehicle to change direction. Where the vehicle 10 has to manoeuvre in a tight space, the vehicle control unit may rotate the wheels 28, 29 in opposite directions to spot-turn the vehicle 10, and then turn both wheels 28, 29 together to advance the vehicle 10 on a new path.

Figure 5C:
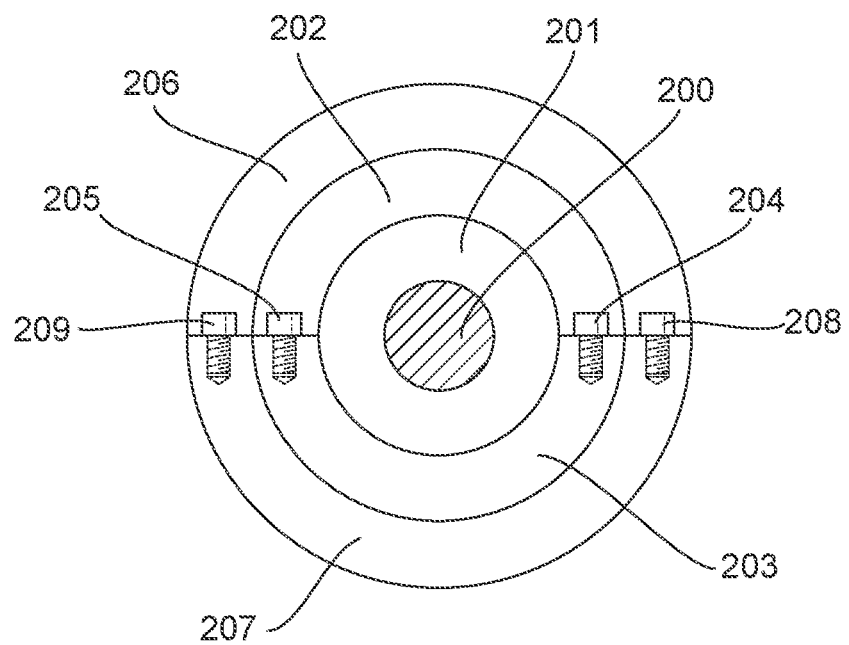
FIG. 5C is a schematic view of components of an example transportation device.

FIG. 5C shows an arrangement of the transportation device, e.g. the vehicle 10. Comprising a structural chassis member 200, which may for example correspond in position on the vehicle 10 to the chassis member 24 of the previous embodiment. A battery pack 201 may provide power to the vehicle 10, for example to power the wheel motors or steering motor of the vehicle 10.

The chassis member 200 is at least partially contained in the removable battery pack 201, which may comprise a first battery pack half 202 joined to a second battery pack half 203. The two halves 202 and 203 are fixed together around the chassis member 200 by releasable fasteners such as screws or bolts 204 and 205 and may provide structural support for the chassis member 200. The two halves 202 and 203 may be substantially C-shaped in cross section.

In an alternative arrangement, the battery pack is substantially tubular and may be slid over a free end of a removable chassis member 200 to locate it on the chassis member 200.

An outer housing comprising two casing halves 206, 207 may be disposed around the battery pack 202, 203. The two halves 206, 207 may be fixed together around the battery pack 202, 203 by releasable fixings such as screws or bolts 208, 209.

Figure 6:
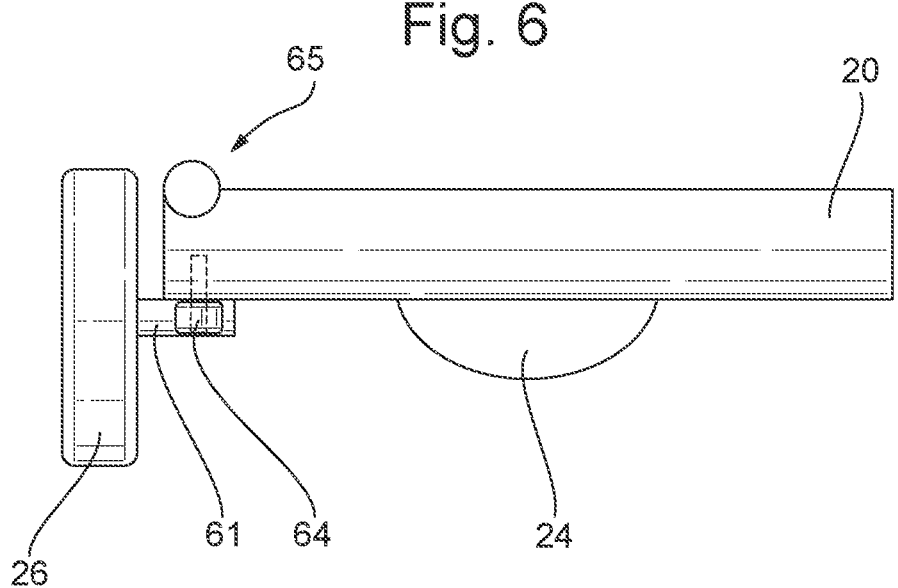
FIG. 6 is a schematic view of components of an example transportation device.

FIG. 6 shows, schematically, one example of a steering assembly. The steering assembly comprises a mount in the form of a king pin assembly which connects axle shaft 61 to first housing unit 20. Wheel 26 is rotatably mounted to the axle shaft 61 (e.g. via a bushing or bearing, for example) so that wheel can rotate with respect to the axle shaft 61. Wheel 27 will have a similar configuration. The steering assembly may further comprise a conventional electrically powered steering rack and steering rods (now shown).

The vehicle 10 comprises retaining means 65 (shown in FIG. 6) for retaining an object such as a demountable cargo body. The retaining means 65 may, for example, be on part of chassis 9 or on part of the second housing unit 22 or third housing unit 24. The retaining means 65 will be further described with reference to FIGS. 8D and 10C.

Figure 7A:
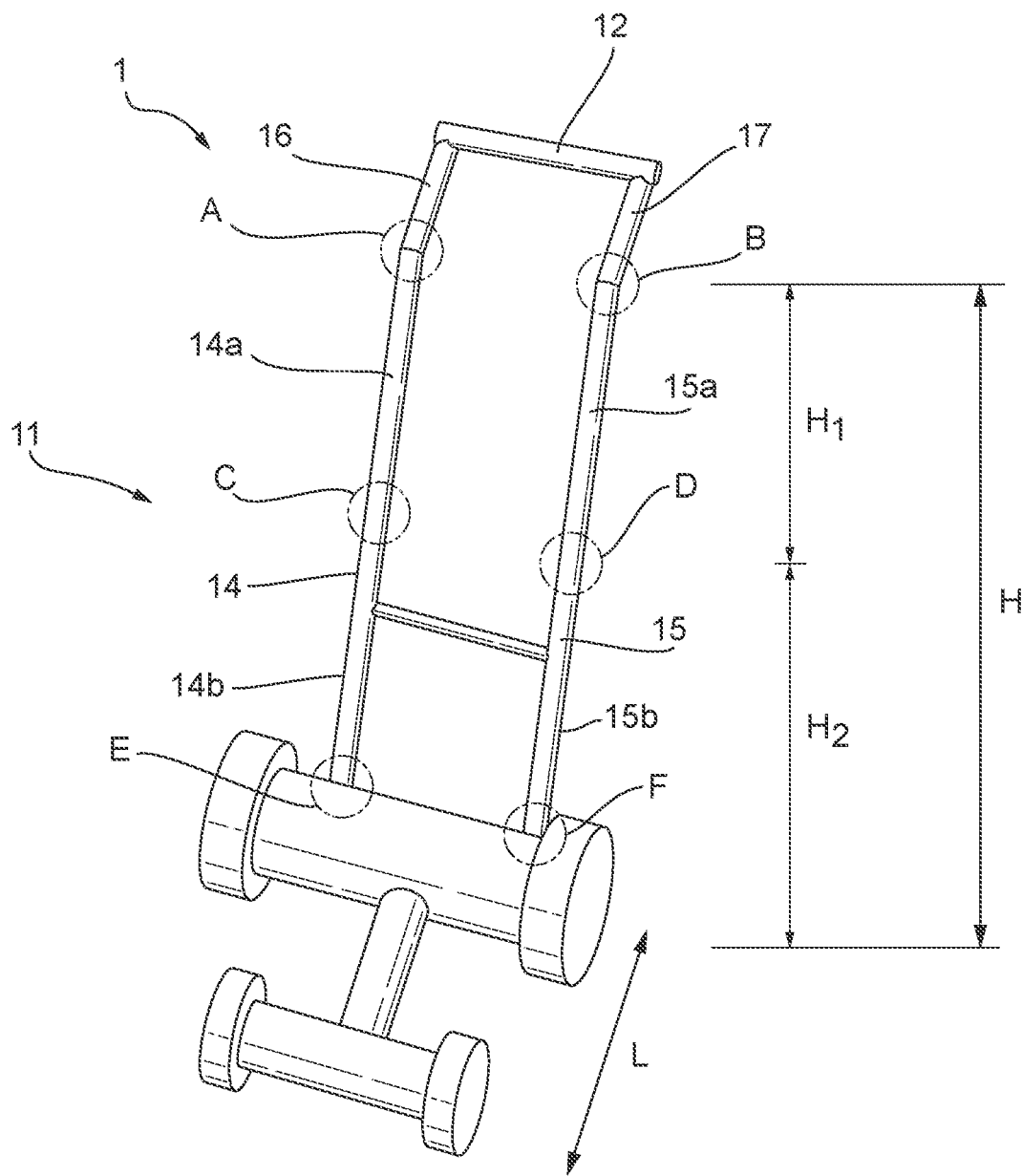
FIGS. 7A-C are schematic views of a further example of a transportation device.
Figure 7B:
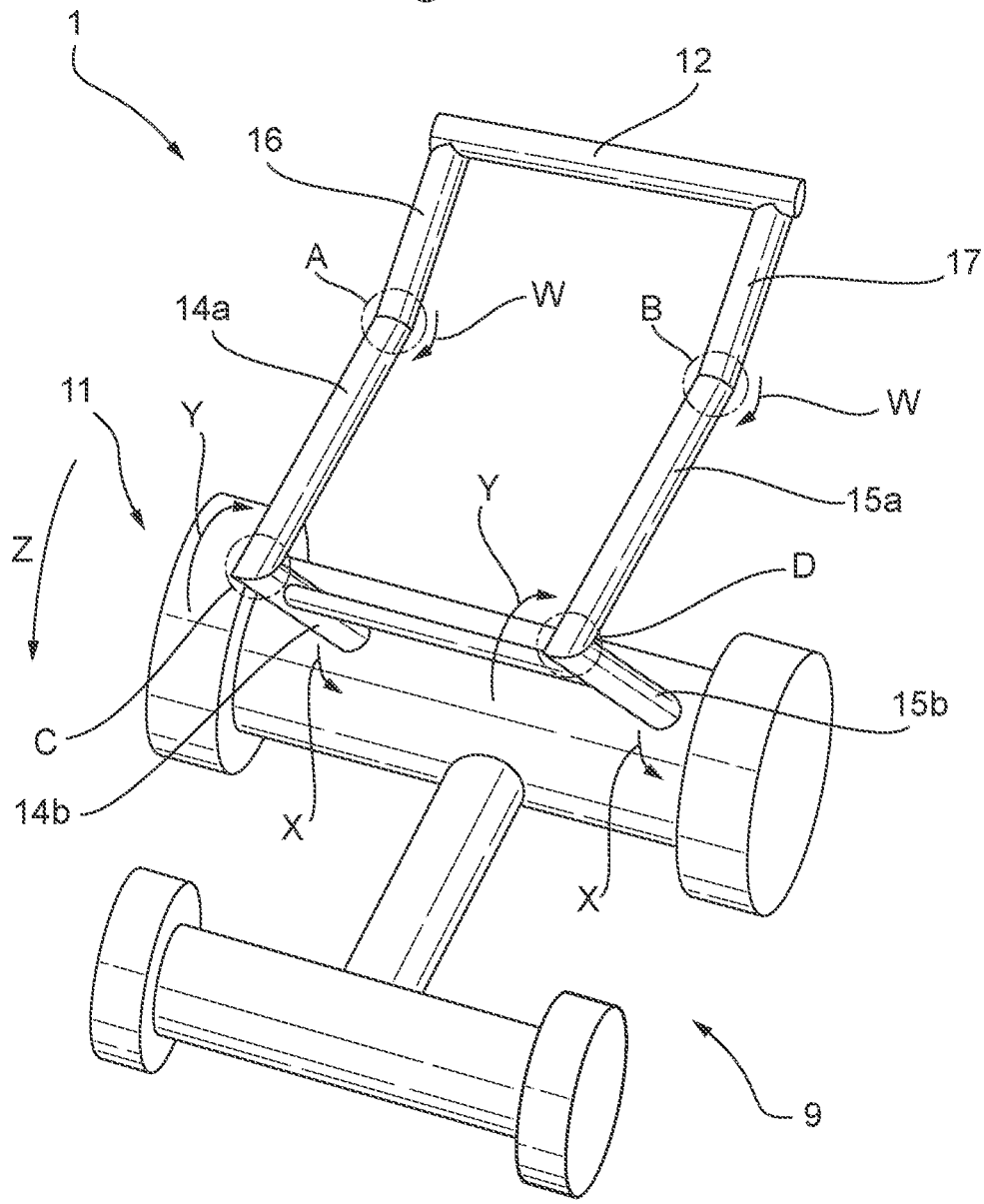
Figure 7C:
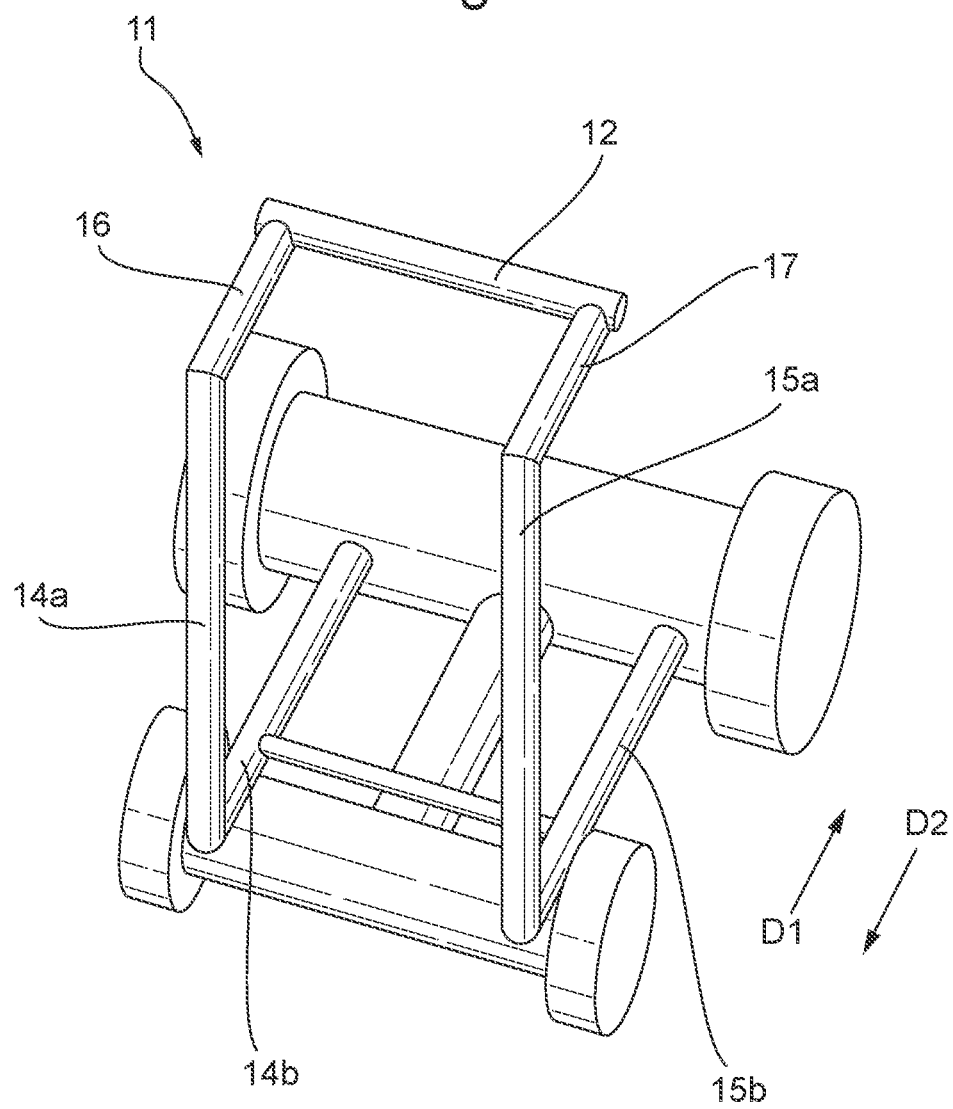

FIGS. 7A-7C show further details of an example frame 11 of vehicle 10. Referring to FIG. 7A, strut 14 comprises a first strut portion 14a and second strut portion 14b. Second strut portion 14b is movably connected to first strut portion 14a about area C. Strut 15 comprises first strut portion 15a and second strut portion 15b. Second strut portion 15b is movably connected to first strut portion 15a about area D. Areas C and D represent a moving or folding mechanism about which each first and second strut portion may move relative to one another. Hereafter areas C and D will be referred to as pivots. Pivots C and D divide each strut 14, 15 into approximately two equal halves. That is, first strut portions 14a, 15a each have a height H1 and second strut portions 14b, 15b each have a height H2, with heights H1 and H2 totalling the height H of the first and second struts 14, 15. H1 and H2 may be the same, so that the lengths of the first strut portions 14a, 15a and second strut portions 14b, 15b are the same. The length of the second strut portions 14b, 15b may be approximately equal to the length L of the vehicle. As will be described in more detail later, when second strut portions 14b, 15b, move about pivot points E and F, respectively, they may fold toward the wheels of the vehicle 10. When the strut portions 14b and 15b are in their folded configuration, the length L of the vehicle 10 may remain the same; i.e. folding either struts 14b, 15b does not increase the profile of the vehicle 10.

FIG. 7A shows that struts 14 and 15 are movable (e.g. foldable or pivotable) about pivots C and D, and also that struts 14 and 15 are movable (e.g. foldable or pivotable) about pivots E and F. Struts 14, 15 may be movably attached to chassis 9 or housing units 20, 22, 24. Arms 16 and 17 that connect handlebar member 12 to struts 14 and 15 are themselves movable about pivot points A and B, respectively. Struts 14 and 15 are therefore articulated struts. Struts 14, 15 may comprise three points of articulation (A, C, E for strut 14, and B, D, F for strut 15).

FIG. 7A shows that frame 11 comprises first strut portions 14a, 15a and second strut portions 14b, 15b which are movably connected to the first strut portions 14a, 15a, respectively. Frame 11 is therefore a movable, collapsible or foldable frame. The mechanism to fold the frame 11 of vehicle 10 will now be described with reference to FIGS. 7B and 7C. The position of the frame 11 as shown in FIG. 7A may be referred to as the "extended configuration" in which first and second strut portions 14a and 14b are aligned to form a single strut 14. Similarly, in the extended position first and second strut portions 15a, 15b are aligned to form single strut 15.

A locking mechanism, or retaining mechanism, may be provided at at least one of the points A-F to lock, or retain, any of strut portions 14a, 15a, 14b, 15b, and arms 16, 17 in place and thereby lock, or retain, the frame in the extended position. At least one release mechanism may also be provide to release any locking mechanism, or retaining mechanism, to thereby enable movement of the frame toward a second position.

FIG. 7B shows one example process of folding foldable frame 11 of vehicle 10 from its extended position (shown in FIG. 7A) to a "folded position" (shown in FIG. 7C). The release mechanisms are actuated to release the corresponding locking mechanisms to thereby enable movement of the frame components. The first frame portions 14a, 15a are movable about pivots C, D in the direction of arrow Y. Second frame portions 14b, 15b are movable about pivots E, F in the direction of arrow X.

Movement of the first frame portions 14a, 15a in the direction of arrow Y causes first frame portions 14a, 15a to move closer to second frame portions 14b, 15b. Movement of the second frame portions 14b, 15b in the direction of arrow X causes second frame portions 14b, 15b to move closer to chassis 9 of vehicle 10. This has the effect of moving the frame 11 in the direction of arrow Z, as the frame 11 is effectively folded toward the chassis 9 to a smaller profile. Arms 16 and 17 also move (e.g. in the direction of arrow W, or in an opposite direction) about pivots A, B so as to enable movement of the handlebar member 12. Thus, the frame folds in a 'Z fold' or concertina fashion.

Alternatively, handlebar member 12 may be disengageable from arms 16, 17 such that handlebar member 12 may be removed from frame 11. Arms 16, 17 may be configured to swivel about struts 14 and 15. Movement of the handlebar member 12 may therefore be effected by disengaging handlebar member 12 from arms 16, 17; swivelling arms 16, 17 approximately 180 degrees each; and then reattaching handlebar member 12 to arms 16, 17. This will have the effect of reversing the handlebar member 12. Handlebar member 12 is therefore reversible.

FIG. 7C shows an example frame 11, once its components have folded as shown in FIG. 7B. In FIG. 7C frame 11 is in a position referred to as the "scooter configuration". In this configuration, the second strut portion 14b is at an angle with respect to first strut portion 14a. Similarly, second strut portion 15b is at an angle with respect to second strut portion 15a. The angles may be 90 degrees. The second strut portions 14b, 15b may be parallel to the chassis 9 of vehicle 10 in this configuration.

Referring to FIG. 7B, arms 16 and 17 have moved in the direction of arrow W about pivots A, B. The configuration of the handlebar member 12 has effectively reversed so that it is in a configuration facing towards the vehicle 10. In such a configuration handlebar member 12 may be comfortably gripped by a user when the vehicle 10 is in the "scooter configuration" illustrated in FIG. 7C.

It will be appreciated that moving the frame 11 of the vehicle 10 from a first (expanded) to a second (scooter) configuration requires that the main direction of travel of the vehicle 10 is reversed. With reference to FIG. 7A the struts 14, 15 are disposed or configured so that a user may move the vehicle 10 in the direction of travel D1 (with reference to FIG. 7C). The handlebar member 12 is disposed substantially over the second wheel set (comprising wheels 28, 29). The user may stand on the vehicle 10, holding handlebar member 12 and, via control knob or wheel 30, control the vehicle to move in the direction D1.

In the scooter configuration depicted in FIG. 7C, the handlebar member 12 is disposed substantially over the first wheel set (comprising wheels 26, 27). The user may stand on the vehicle 10, holding handlebar member 12 and control the vehicle to move in the direction D2. In the scooter configuration a smaller user, such as a child, may operate the vehicle from a standing position. Alternatively, a user may operate the vehicle from a seated position because in the scooter configuration, the height of the frame H has been lowered (and is substantially equal to height H1 of the first strut portions 14a, 15a).

Figure 8A:
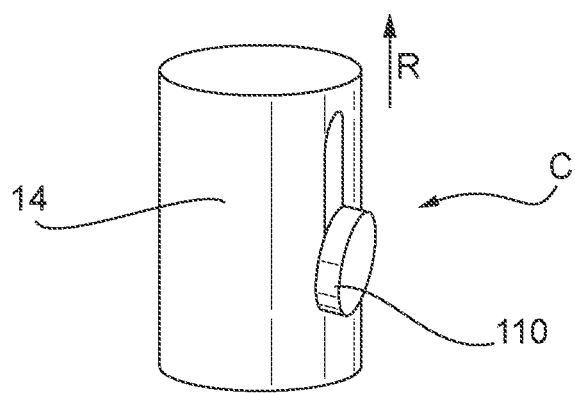

FIG. 8A shows one example way of movably locking first and second strut portions 14a, 14b of strut 14 to one another, at pivot portion C. A three-way latch 110 may be movable between a first, second, and a third position. One position may lock the first and second strut portions 14a, 14b in their respective positions in the extended configuration as shown in FIG. 7A. A second one of the three positions may disengage the locking mechanism so as to enable foldable/pivotable movement of the strut portions 14a, 14b to move them into the scooter configuration as shown in FIG. 7C. A third one of the three positons may lock the first and second strut portions 14a, 14b in the scooter configuration. As depicted in FIG. 8A, latch 110 may be movable in the direction R to a position that enables movement of the strut 14 (relative movement of the first and second strut portions 14a, 14b).

Alternatively, three-way latch 110 may have a first position to lock the strut 14 in place, a second position to release the locking mechanism, and a third position to retain a second strut that will be described later with reference to FIGS. 9A-F.

Figure 8B:
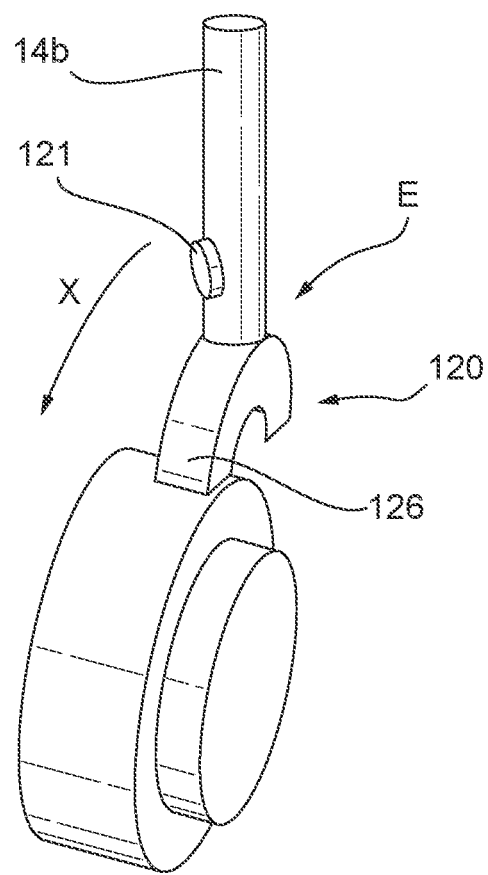
Figure 8C:
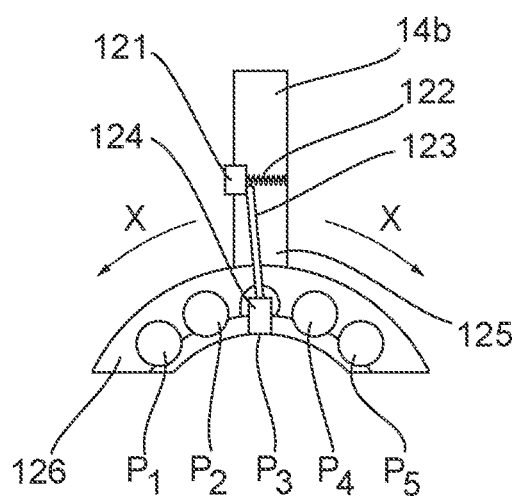

FIGS. 8B and 8C show one exemplary way of movably locking second strut portion 14b. Mechanism 120 is a locking and release mechanism comprising pin 121 disposed in strut portion 14b. Pin 121 is connected via rod 123 to a catch 124. Depression of the pin 121 moves the rod 123 so as to disengage catch 124 from any of holes P1-P5. When catch 124 is disengaged from holes P1-P5, strut portion 14b may be moved about housing 126 of locking mechanism 120 in the direction of arrow X.

Spring 122 biases pin 121 outwardly so that, to move strut portion 14b in direction X, pin 121 must be depressed so as to overcome the bias of spring 122. When pin 121 is depressed, catch 124 is released from opening P1-P5 so that the strut portion 14b can be moved in the direction X to a new position. When the pin 121 is released, the catch 124 re-engages in another of the holes P1-P5 to fix the position of the strut portion 14b.

It will therefore be appreciated that second portion 14b of strut 14 is movable between a range of discrete angular positions, one of which corresponds to the extended orientation (FIG. 7A) and one of which corresponds to the scooter orientation (FIG. 7C) of strut portion 14b.

Although depicted only for strut 14, it will be understood that the same, or similar, locking mechanisms depicted in FIGS. 8A-C may be utilised for strut 15. Both struts may therefore be movable, separately or together, between a range of positions (discrete or continuous).

FIG. 8D shows an example of a retaining mechanism 65 which retains second strut portion 14b. Retaining mechanism 65 is provided in the first housing unit 20. In this example, retaining mechanism 65 may be a recess adapted to receive a portion of the second strut portion 14b. The second strut portion 14b may be held in place by a snap or friction fit. Stops 130, 132 may be provided at the recess to facilitate a snap fit. Stops 130, 132 may comprise a resiliently deformable material, e.g. a material comprising deformable plastics material. Alternatively the stops 130, 132 may be replaced by an alternative releasably fixing mechanism such as a circlip or locking ring.

FIG. 8D depicts the first housing unit 20 and retaining mechanism 65 when the frame 11 of vehicle 10 is in the scooter orientation. It will be appreciated that in the scooter orientation, second strut portion 14b is folded toward chassis 9 of vehicle 10. In order to secure the second strut portion 14b, and thereby secure the frame 11 in the folded position, second strut portion 14b is retained or secured by the retaining mechanism 65. According to the example of FIG. 8D, second strut portion 14b may be received in the recess in the first housing unit 20 to retain the second strut portion 14b and effectively lock the frame 11 in the folded position.

A second retaining mechanism, similar to retaining mechanism 65, may be provided at an opposite end of the first housing 20 unit and may be configured to receive second strut portion 15b. Both strut portions 14b, 15b may therefore be retained when the frame 11 is in its folded position.

FIG. 9A shows another example of frame 11 of the vehicle 10. Strut 14 comprises a further strut 140 that, as explained later, is configured to support a demountable body. The further strut 140 is at least partially housed within and slideable relative to strut 14, such that it is slideable between a stowed position and a deployed position. Strut 14 is hollow and is adapted to accommodate the strut 140 when in its stowed position. FIG. 9A shows strut 140 sliding out of strut 14 to its deployed position. The deployed position is shown in FIG. 9B.

FIG. 9A also shows that strut 15 comprises a further strut 141 that is configured to support a demountable body. The further strut 141 is at least partially housed within and slideable relative to strut 15, such that it is movable between a stowed position and a deployed position. Strut 15 is hollow and is adapted to accommodate the strut 141 when in its stowed position. FIG. 9A shows further strut 141 sliding out of strut 15 to its deployed position. The deployed position is shown in FIG. 9B.

The strut 31 which connects struts 14 and 15 may instead connect the further struts 140, 141 and therefore may move with the further struts 140, 141.

When further struts 140 and 141 are in their fully stowed configuration they are received within struts 14, 15, respectively, and the vehicle 10 takes on the appearance shown in FIG. 7A.

The struts 140 and 141 are movable into the position shown in FIG. 9B in which the struts 140, 141 brace the frame to the chassis 9.

Struts 140, 141 may be completely contained within struts 14, 15 and may telescopically extend out to the configuration shown in FIG. 9A. Alternatively, struts 140, 141 may be a movable portion of struts 14, 15 such that when they are extended to the configuration shown in FIG. 9A struts 14, 15 are effectively elongated (with further struts 140, 141 remaining attached to struts 14,15 respectively).

To move the further struts 140, 141 to their deployed position they are pulled upwards (relative to the wheels of the vehicle) and out of struts 14, 15 to a fully extended positon (shown in FIG. 9A). The further struts 140, 141 may then be moved in the direction of arrow V and brought toward chassis 9. The frame 11 is then in a "deployed configuration", shown in FIG. 9B. In the deployed configuration the frame 11 is braced to the chassis, and the strut 31 which may connect further struts 140 and 141 may, at least in part, be used to retain another article. For example, connecting strut 31 in this configuration forms a cross member that can be used to retain, an article. Struts 31, 140, 141 may therefore be used to retain a demountable body, cradle or seat, for example.

A locking mechanism (not shown) may be provided to lock further struts 140, 141 in their stowed and/or deployed positions.

FIG. 9C shows one example of how further strut 140 may move inside strut 14. Further strut 140 is shown in dashed lines and is shown partially extended out of strut 14. Further strut 140 is attached to a wheel 142. On an interior surface of strut 14 there is disposed a track 144 along which wheel 142 may move. Further strut 140 is therefore movable smoothly inside strut 14 by virtue of engagement of the wheel 142 with track 144. Strut 14 may comprise track 144. When the further strut 140 is in its fully extended position, the wheel 142 is in a position (showed by the dashed lines 145) at a wider part 146 of the rail. A locking mechanism may be provided, schematically shown in FIG. 9C as pin 150. Pin 150 is pivotally movable about pivot 148 from the position shown in FIG. 9C in which it will prevent the wheel from escaping the wider part 146 of the rail track 144 to a position which will allow movement between the wider part 146 of the rail track 144 and the remainder of the rail track 144.

When pin 150 is in the position shown in FIG. 9C and the further strut 140 is fully extended, such that the wheel 142 is in the position 145, the further strut 140 may move in the direction of arrow V to the deployed position shown in FIG. 9B.

Figure 9D:
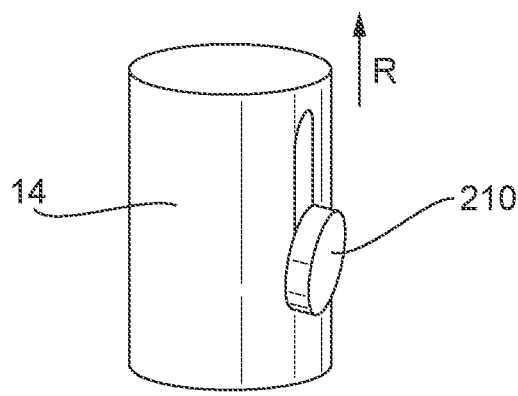

A further example of a locking/release mechanism is shown in FIG. 9D. A latch 210 is movable between at least two positions—a locking position and a release position. For example, latch 210 may be a three-way latch movable between a first, second, and a third position. Latch 210 may be movable in the direction R to a position that enables movement of the further strut 140.

Figure 9E:
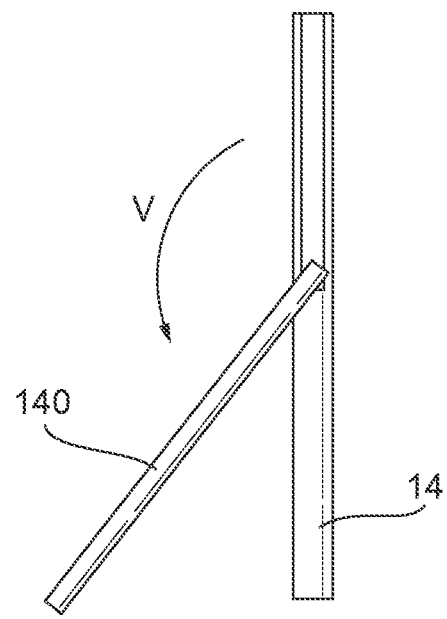

FIG. 9E depicts the further strut 140 being swung to its deployed position.

Figure 9F:
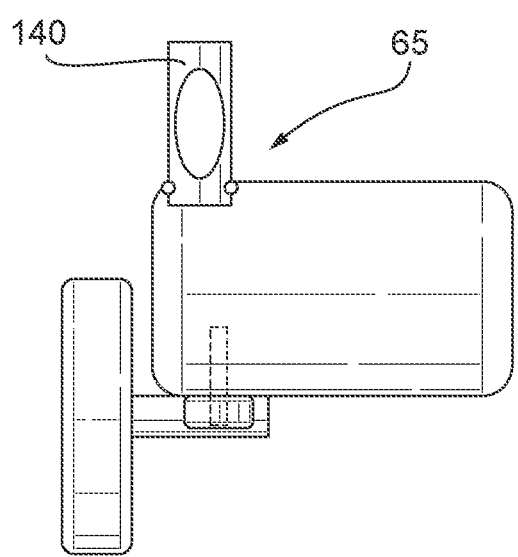

FIG. 9F depicts the further strut 140 being retained in its deployed position via retaining mechanism 65 in the first housing unit 20.

It will be understood that any reference to the features and movement of strut 14 with reference to FIGS. 9A-F may apply equally to strut 15 (and therefore further strut 141). Accordingly, frame 11 may be said to be movable to a deployed position (in which further struts 140 and 141 are in their deployed positions). In the deployed position, struts 14, 15 may be in the same orientation as when the further struts 140, 141 are stowed in the struts 14, 14.

Struts 14, 15 may be movably secured to second housing unit 22, or any other part of the chassis. The frame 11 is therefore secured to the vehicle 10 at at least two points. For example, strut 140 may be secured to the vehicle by retention means 65 and strut 14 may be secured to the vehicle at second housing unit 22. In another example, struts 140, 141 may be secured to the vehicle via retention means and struts 14, 15 may be secured to the vehicle at second housing unit 22. In this example, there may be four points of contact between the frame 11 and the housing units 20, 22. Alternatively, four points of contact may be provided between the frame 11 and the chassis 9. Accordingly, the frame 11 may be retained on one wheel axle and connected at its other end to another wheel axle.

Figure 10A:
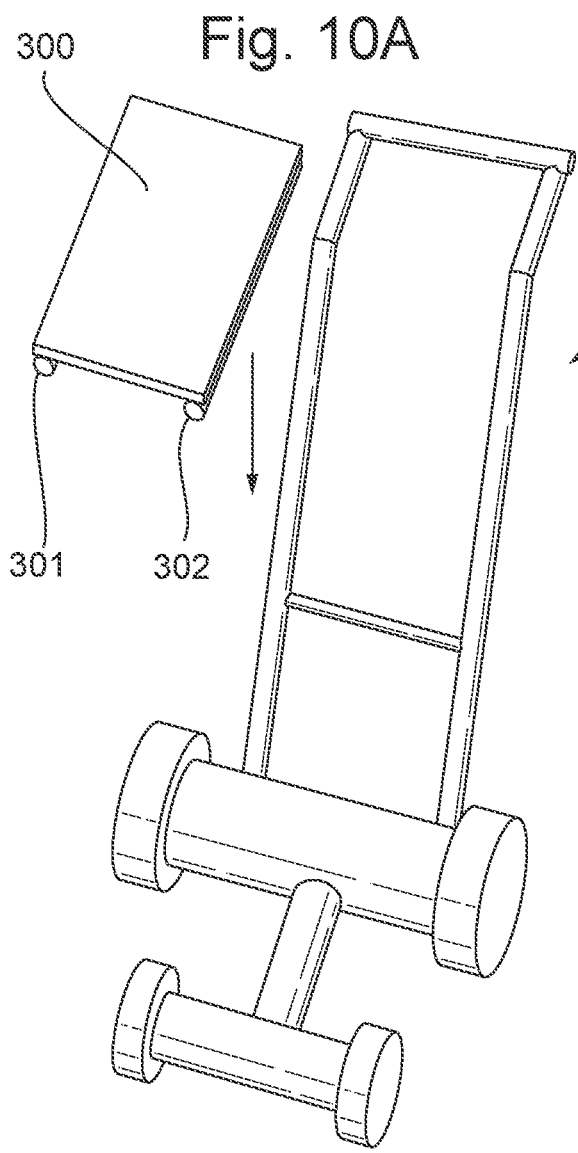
FIG. 10A is a schematic view of a further example of a transportation device.

FIG. 10A shows an arrangement of vehicle 10, which is configured to receive and retain a platform 300, for example for carrying cargo or a passenger. Platform 300 comprises support ribs 301, 302.

Figure 10B:
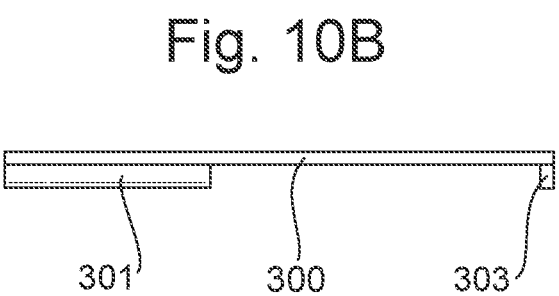
FIGS. 10B-C are schematic views of components of an example transportation device.

FIG. 10B shows that platform 300 comprises a clip 303 located on the same side of the platform 300 as retaining rib 301. A similar clip 303 (not shown) may be located in the same location as clip 303 but on the same side as retaining rib 302.

Figure 10C:
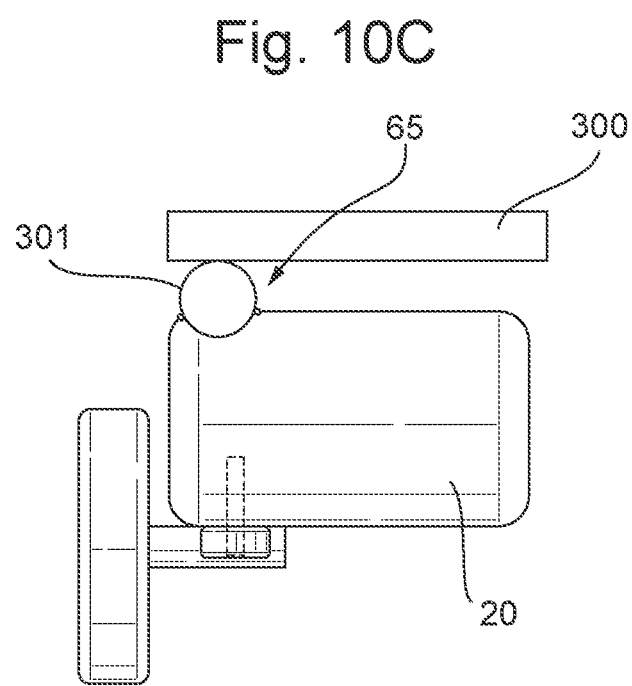

FIG. 10C shows the rib 301 of platform 300 received in a recess in the first wheel housing 20. Whilst not shown in FIG. 100, clips 303 engages second wheel housing 22 to secure platform 300 to the vehicle 10.

In use, the vehicle 10 may be provided in the configuration as shown in FIGS. 2 and 7A. As shown in FIGS. 10A-C a user may mount a cargo or passenger platform 300 to the chassis 9 of the vehicle 10. The resulting vehicle may be a four-wheeled scooter that a user can drive standing on the platform 300. The user may manipulate the speed and/or direction of the vehicle from a standing position via thumb-wheel 30 (as shown in FIG. 2). A basket or other such article may be supported on the vehicle as shown in FIG. 3 by the studs 35, 37 provided on the frame 11.

The user may transform the vehicle 10 into a configuration in which a chair can be mounted to the platform 300, or the chassis 9 itself, so that the user may operate the vehicle 10 from a seated position (as opposed to a standing position). The user may also wish to transform the vehicle 10 into a configuration in which it can be operated by a child. To do so, the user may fold the frame 11 as shown in FIGS. 7A-7C. Specifically, the user may fold struts 14, 15 which each comprise two strut portions into the folded configuration shown in FIG. 7C, locking the struts 14, 15 in place in the folded configuration via at least one of the retaining means 65 provided in the vehicle. The platform 300 may be mounted to the vehicle 10 when the frame 11 (and therefore the vehicle) is in the folded configuration. A child may operate the vehicle from a standing position, standing on the platform 300, taking advantage of the reduced height of the handlebar member 12 in the folded configuration.

Alternatively, in the folded configuration a chair may be mounted to the vehicle 10 allowing a user operational control of the vehicle 10 from a seated position. Again, the reduced height of the handlebar member 12 facilitates such control.

To secure an object, such as a child seat, cot, demountable body or basket to the vehicle 10, the object may be removably attached to the vehicle 10 via the studs 35, 37 provided in the struts 14, 15.

To secure a larger object, i.e. a demountable body, such as a cargo bed or chair to utilise the vehicle 10 as a goody vehicle or pram respectively, the user may utilise second struts (further struts 141, 140) which are disposed within struts 14, 15 to adapt the frame 11 to the braced frame arrangement of FIG. 9B. The demountable body may then be secured to the frame 11 at least partially via the cross-strut 31 and/or strut 14 and/or further strut 140 etc. The user may then push or drive the vehicle 10 whilst walking behind it, rather than manipulating the vehicle 10 whilst riding on it. The vehicle 10 may therefore be driven, or may be provided in a sack truck or manual trolley configuration, such that the wheels simply freewheel independently of any control mechanism, such as units 59, 58 or speed/direction control means 30.

Figure 11A:
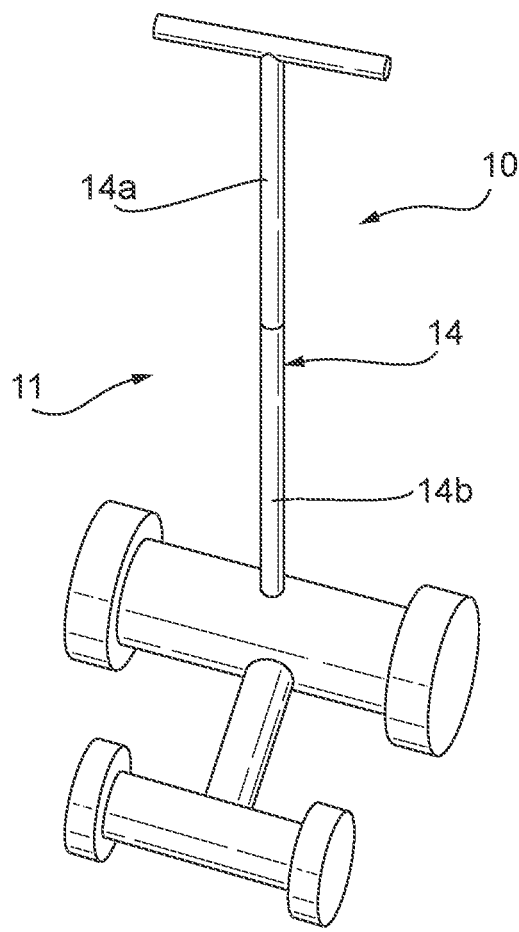
FIGS. 11A-E are schematic views of a further example of a transportation device.
Figure 11B:
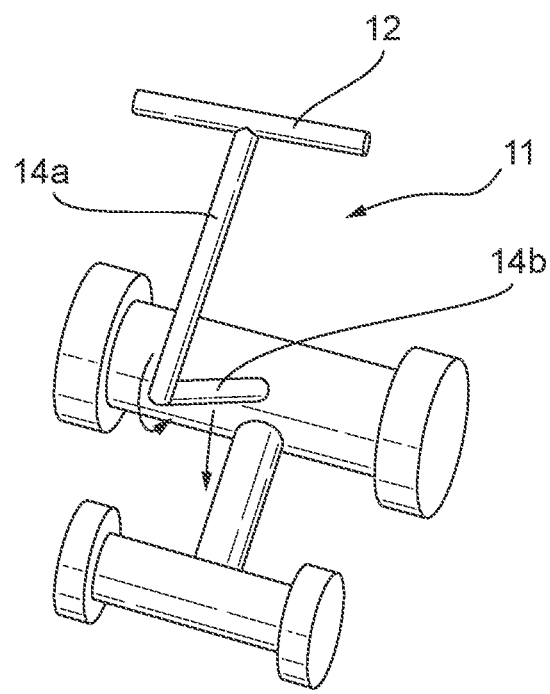
Figure 11C:
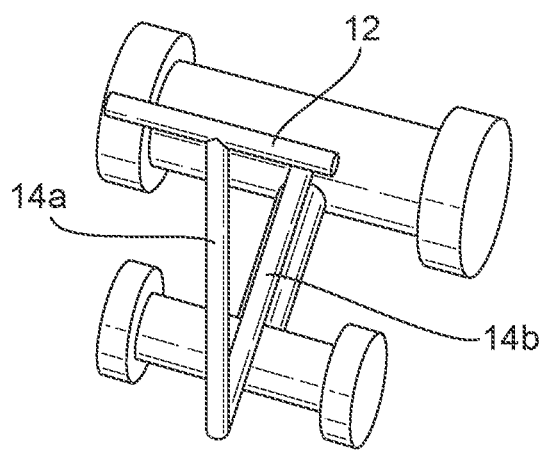

FIGS. 11A-11E show a further arrangement of vehicle 10. Referring to FIG. 11A, vehicle 10 comprises a frame 11. Frame 11 comprises a first strut 14. First strut 14 comprises first strut portion 14a and second strut portion 14b. The first strut 14 is movable between an extended position in which the first and second strut portions 14a, 14b are aligned to form a single strut 14 (the extended position is shown in FIG. 11A) and a folded position in which the second strut portion 14b is at an angle with respect to the first strut portion 14a (the folded position is shown in FIG. 11C).

First and second strut portions 14a, 14b may be approximately equal in length. The strut 14 of FIGS. 11A-E may be substantially identical to strut 14 as depicted in FIGS. 1-10. Accordingly, the vehicle 10 of FIGS. 11A-E may differ only in that a single strut is provided. Accordingly, the mechanisms to move the single strut 14 (and first and second portions comprised therein) may be the same as in the preceding arrangement.

As described with reference to FIG. 7B and FIG. 11B first and second strut portions 14a, 14b are movable so as to fold frame 11 into the folded configuration shown in FIG. 11C.

As only a single strut is provided, handlebar member 12 extends from the single strut 14. Handlebar member 12 may be rigidly mounted to the strut 14, for example it may be welded to the strut 14. In an alternative arrangement the handlebar member 12 may be mounted to the single strut 14 such that it is movable about the strut 14 to a range of configurations.

Handlebar member 12 may be rotatably secured to the strut 14 such that it is rotatable between a variety of positions.

Figure 11D:
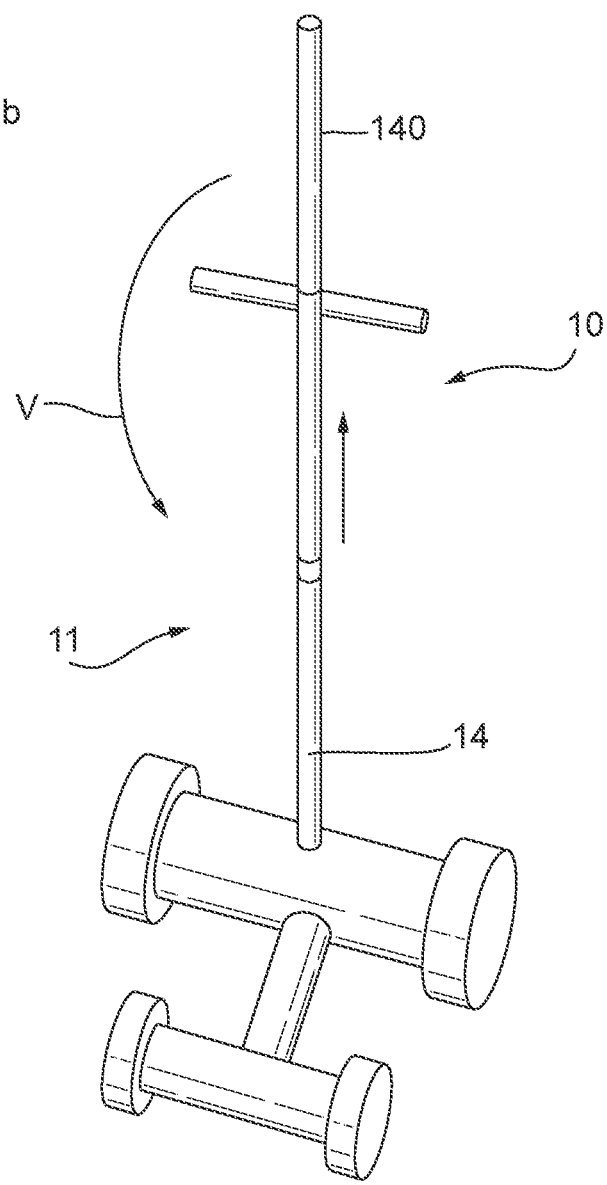

Referring to FIG. 11D, first strut 14 comprises second strut 140. Second strut 140 may be for supporting a demountable body. Second strut 140 is movably connected to first strut 14 and is movable between a stowed position (shown in FIG. 11A) and a deployed position (shown in FIG. 11E). FIG. 11D shows the second strut 140 moving between its stowed position and its deployed position. First strut 14 comprises a recess or hollow interior adapted to accommodate the second strut 141 in its stowed position. FIG. 11D shows the second strut 140 moving out of the hollow interior of strut 14, and upward relative to the vehicle 10. Second strut 140 then moves in the direction of arrow V to the deployed configuration as shown in FIG. 11E.

Second strut 140 may be pivotably or rotatably connected to first strut 14. Second strut 140 may be connected to first strut 14 at one end only.

Figure 11E:
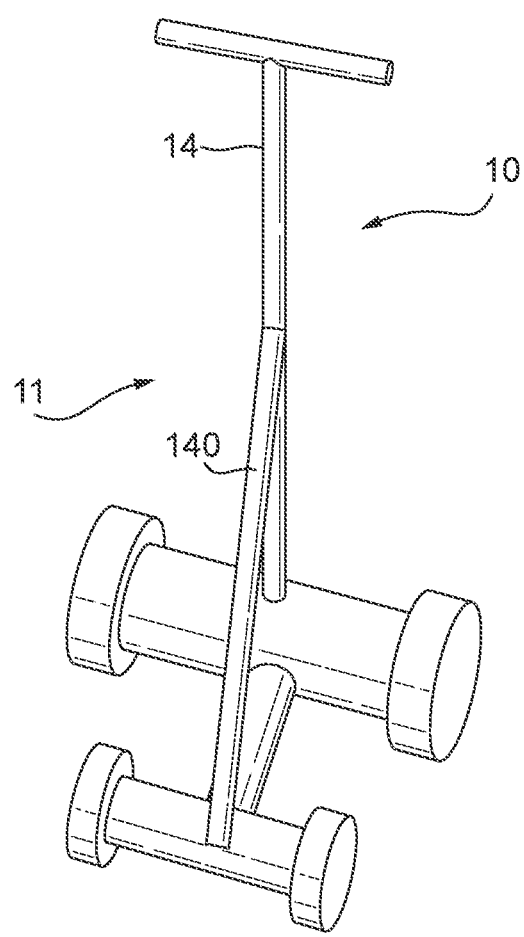
Figure 12:
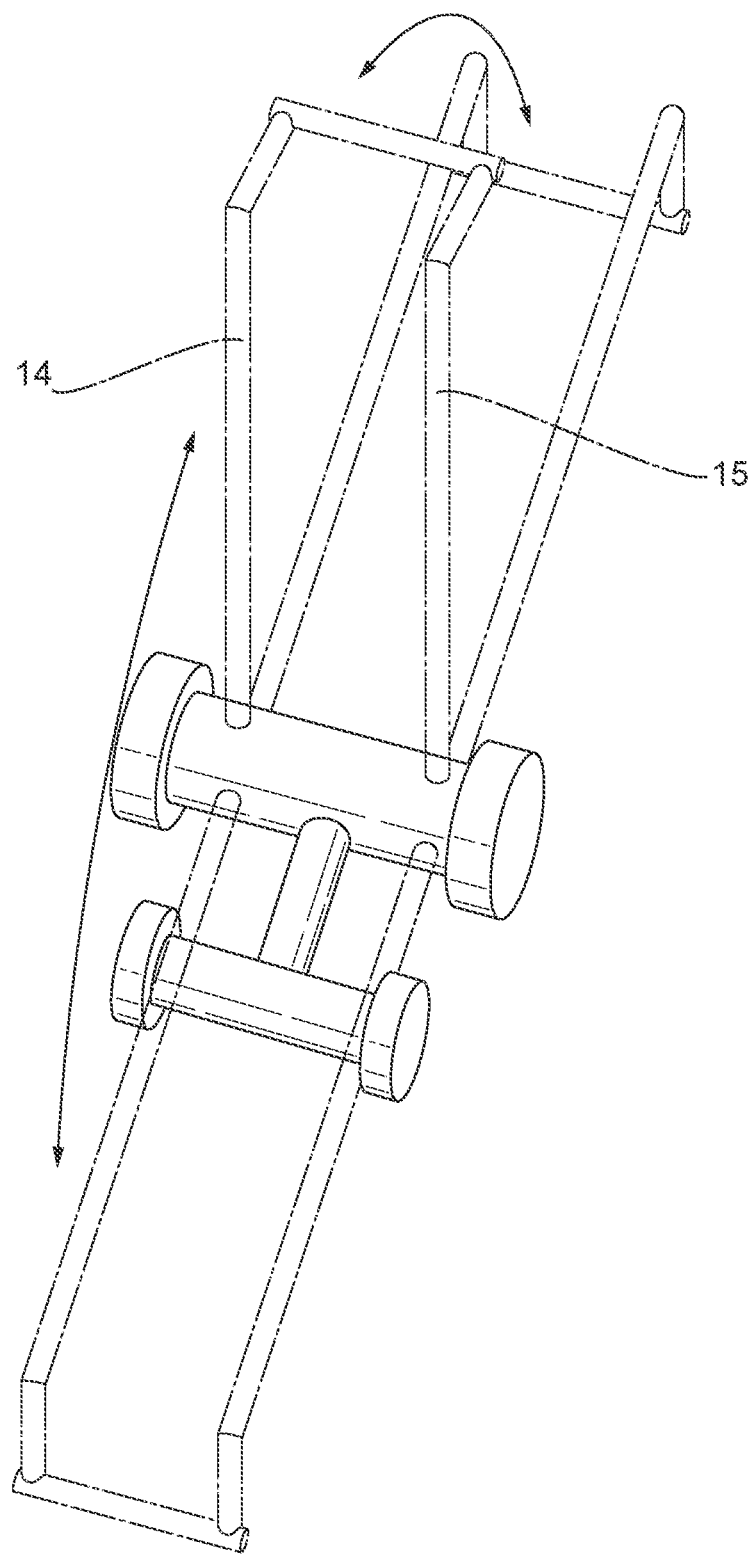
FIG. 12 is a schematic view of a further example of a transportation device.

FIG. 11E shows the second strut 140 in its deployed position. Frame 11 may take the form of an A-frame. Second strut 140 is secured to chassis 9 of the vehicle 10 via a retaining means (not shown ion FIG. 11E). Any suitable retaining means is envisaged, such as releasable fasteners (bolts, screws, clips etc). The retaining means may be provided in any part of the vehicle.

According to the above arrangements, the multi-use transportation device may comprise a fully configurable frame.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. A personal mobility vehicle, comprising:
   a chassis;
   a frame attached to and extending from the chassis and comprising releasable anchor points for retaining a plurality of alternative bodies on the frame one at a time, wherein the frame comprises a first strut and second strut and a first arm and second arm, wherein the first strut is disposed between the chassis and the first arm and the second strut is disposed between the chassis and the second arm, wherein the first strut comprises a first portion and a second portion, wherein the second strut comprises a third portion and a fourth portion, wherein the frame is adaptable to be folded from a first configuration into a second configuration, wherein in the second configuration the first portion is at an angle with respect to the second portion and the third portion is at an angle with respect to the fourth portion, and wherein the first is at an angle with respect to the first portion and the second arm is at an angle with respect to the third portion, and wherein a direction of travel of the personal mobility vehicle is reversed in the second configuration; and a control unit configured to control a steering function of the personal mobility vehicle, wherein the control unit is configured to recognize at least one authorized personal smart device, wherein the control unit is configured to receive route information from the at least one authorized personal smart device, and wherein the control unit is configured to at least semi-autonomously control the personal mobility vehicle based on the route information.

2. The personal mobility vehicle of claim 1, further comprising a holder for retaining the at least one authorized personal smart device, wherein the holder comprises a charging connection configured to charge the at least one authorized personal smart device.

3. The personal mobility vehicle of claim 2, wherein the charging connection is configured to automatically connect the at least one authorized personal smart device to a source of electrical power when the at least one authorized personal smart device is docked in the holder.

4. The personal mobility vehicle of claim 2, wherein the control unit is configured to connect wirelessly to the at least one authorized personal smart device, wherein the control unit is configured to disable the personal mobility vehicle until the at least one authorized personal smart device is docked in the holder, and wherein the control unit is configured to disable the personal mobility vehicle until the at least one authorized personal smart device is docked in the holder.

5. The personal mobility vehicle of claim 4, wherein the control unit is configured to record information associated with the at least one authorized personal smart device, and wherein the control unit is configured to store the information associated with the at least one authorized personal smart device in a memory, and wherein the control unit is configured to record details of one or more journeys taken by the personal mobility vehicle and information associated with the at least one authorized personal smart device that is connected to the personal mobility vehicle during the one or more journeys.

6. The personal mobility vehicle of claim 2, wherein the holder is provided on a handlebar member of the personal mobility vehicle.

7. The personal mobility vehicle of claim 1, wherein the control unit is configured to control a drive motor of the personal mobility vehicle, and wherein the control unit is configured to control a maximum speed of the personal mobility vehicle dependent on location data provided to the control unit by the at least one authorized personal smart device.

8. The personal mobility vehicle of claim 1, further comprising at least one sensor in communication with the control unit, wherein the control unit is configured to send data from the at least one sensor to the at least one authorized personal smart device during a journey of the personal mobility vehicle, wherein the data is stored by the at least one authorized personal smart device.

9. The personal mobility vehicle of claim 8, wherein the at least one sensor comprises a camera and the data from the camera comprises video footage of the journey.

10. The personal mobility vehicle of claim 1, wherein the chassis further comprises a first housing, a second housing, and a third housing, wherein the first housing comprises a first wheel and a second wheel, wherein the second housing comprises a third wheel and a fourth wheel, and wherein the first housing and second housing are connected using the third housing.

11. The personal mobility vehicle of claim 1, wherein the first strut further comprises a first stud, wherein the second strut further comprises a second stud, and wherein the first stud and second stud are configured to receive an object that is removably attached to the personal mobility vehicle.

12. A method, comprising:

detecting, by a control unit of a personal mobility vehicle, at least one authorized personal smart device, wherein the personal mobility vehicle includes a chassis, and a frame attached to and extending from the chassis and comprising releasable anchor points for retaining, one at a time, a plurality of alternative bodies on the frame, wherein the frame comprises a first strut and a first arm and a second strut and a second arm, wherein the first strut is disposed between the chassis and the first arm, wherein the first arm and second arm are moveable from a first position to a second position relative to the first strut and second strut, wherein the personal mobility vehicle further comprises a handlebar member comprising a thumb wheel to control the personal mobility vehicle, and wherein the personal mobility vehicle is adapted to be folded when not in use;

receiving, by the control unit, route information from the at least one authorized personal smart device; and semi-autonomously steering, by the control unit and based on the route information, the personal mobility vehicle.

13. The method of claim 12, further comprising retaining the at least one authorized personal smart device in a holder of the personal mobility vehicle, wherein the holder comprises a charging connection configured to charge the at least one authorized personal smart device, wherein the charging connection is configured to automatically connect the at least one authorized personal smart device to a source of electrical power when the at least one authorized personal smart device is docked in the holder.

14. The method of claim 13, further comprising disabling, by the control unit, the personal mobility vehicle until the at least one authorized personal smart device is docked in the holder.

15. The method of claim 12, wherein the control unit is configured to record information associated with the at least one authorized personal smart device, and wherein the control unit is configured to store the information associated with the at least one authorized personal smart device in a memory, wherein the control unit is configured to record details of one or more journeys taken by the personal mobility vehicle and information associated with the at least one authorized personal smart device that is connected to the personal mobility vehicle during the one or more journeys.

16. A system, comprising:
a chassis of a personal mobility vehicle, and a frame attached to and extending from the chassis and comprising releasable anchor points for retaining, one at a time, a plurality of alternative bodies on the frame, wherein the frame further comprises a first strut and second strut and a first arm and second arm, wherein the first strut is disposed between the chassis and the first arm and the second strut is disposed between the chassis and the second arm, wherein the personal mobility vehicle is adapted to be folded when not in use, wherein the frame further comprises a third strut and a fourth strut, the third strut being slideable between a stowed position within the first strut, and the fourth strut being slideable between a stowed position within the second strut; and
a control unit configured to:
control a steering function of the personal mobility vehicle, recognize the at least one authorized personal smart device;
receive route information from the at least one authorized personal smart device;
and
autonomously or semi-autonomously control the personal mobility vehicle based on the route information.

17. The personal mobility vehicle of claim 16, wherein the third strut and fourth strut are further configured to brace the chassis.

* * * * *